US010616917B2

(12) United States Patent
Babaei et al.

(10) Patent No.: US 10,616,917 B2
(45) Date of Patent: *Apr. 7, 2020

(54) GROUPING UPLINK GRANTS AND LISTEN BEFORE TALK CLASSES

(71) Applicant: Ofinno, LLC, Reston, VA (US)

(72) Inventors: Alireza Babaei, Fairfax, VA (US); Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,617

(22) Filed: Jun. 12, 2019

(65) Prior Publication Data

US 2019/0297644 A1   Sep. 26, 2019

Related U.S. Application Data

(63) Continuation of application No. 15/583,024, filed on May 1, 2017, now Pat. No. 10,334,624.

(60) Provisional application No. 62/329,844, filed on Apr. 29, 2016.

(51) Int. Cl.
*H04W 4/00* (2018.01)
*H04W 72/14* (2009.01)
*H04L 5/00* (2006.01)
*H04W 72/12* (2009.01)

(52) U.S. Cl.
CPC ............ *H04W 72/14* (2013.01); *H04L 5/00* (2013.01); *H04L 5/0053* (2013.01); *H04L 5/0094* (2013.01); *H04W 72/1242* (2013.01)

(58) Field of Classification Search
USPC ....... 370/229, 230, 236, 252, 328, 329, 330, 370/343, 345
See application file for complete search history.

(56) References Cited

U.S. PATENT DOCUMENTS

| 10,334,624 | B2 * | 6/2019 | Dinan | H04W 72/14 |
| 2014/0177573 | A1 * | 6/2014 | Han | H04W 72/1242 370/329 |
| 2016/0227568 | A1 * | 8/2016 | Li | H04L 5/001 |
| 2016/0278118 | A1 * | 9/2016 | Yerramalli | H04L 5/001 |

(Continued)

OTHER PUBLICATIONS

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

(Continued)

*Primary Examiner* — Kwang B Yao
*Assistant Examiner* — Nguyen H Ngo
(74) *Attorney, Agent, or Firm* — David Grossman; Kavon Nasabzadeh; Philip Smith

(57) ABSTRACT

A wireless device receives uplink grants for licensed assisted access (LAA) cells. An uplink grant in the uplink grants comprises a listen before talk class indicating a maximum channel occupancy time. The uplink grants are grouped into grouped grants. A first grouped grant of the grouped grants comprises a first plurality of uplink grants each indicating a listen before talk class of a same maximum channel occupancy time. Radio resources, indicated by the first grouped grant, are allocated to one or more first logical channels. Transport blocks corresponding to the first plurality of uplink grants are generated. The wireless device transmits the transport blocks.

20 Claims, 21 Drawing Sheets

(56) References Cited

U.S. PATENT DOCUMENTS

| | | | |
|---|---|---|---|
| 2016/0345353 A1* | 11/2016 | Bergstrom | H04L 5/001 |
| 2016/0360553 A1 | 12/2016 | Cheng et al. | |
| 2017/0238342 A1* | 8/2017 | Yang | H04W 76/10 370/329 |
| 2017/0257852 A1* | 9/2017 | Wu | H04B 7/063 |
| 2017/0280475 A1 | 9/2017 | Yerramalli et al. | |
| 2017/0289869 A1 | 10/2017 | Nogami et al. | |
| 2018/0020445 A1* | 1/2018 | Harada | H04J 1/00 |
| 2018/0048498 A1* | 2/2018 | Stern-Berkowitz | H04L 5/0048 |
| 2018/0098223 A1* | 4/2018 | Hugl | H04W 72/1268 |
| 2018/0124749 A1 | 5/2018 | Park et al. | |
| 2018/0124811 A1* | 5/2018 | Yi | H04W 72/1247 |
| 2018/0242353 A1 | 8/2018 | Lei | |
| 2018/0343639 A1 | 11/2018 | Zheng et al. | |
| 2018/0359772 A1 | 12/2018 | Park et al. | |

OTHER PUBLICATIONS

3GPP TS 36.211 V13.1.0 (Mar. 2016), Technical Specification, 3rd Generation Partnership Project; Technical Specification Group Radio Access Network; Evolved Universal Terrestrial Radio Access (E-UTRA);Physical channels and modulation, (Release 13).
3GPP TS 36.212 V13.1.0 (Mar. 2016), Technical Specification, 3rd Generation Partnership Project; Technical Specification Group Radio Access Network; Evolved Universal Terrestrial Radio Access (E-UTRA);Multiplexing and channel coding, (Release 13).
3GPP TS 36.213 V13.0.1 (Jan. 2016), Release 13, Technical Specification (TS).
3GPP TS 36.300 V13.3.0 (Mar. 2016), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).
3GPP TS 36.321 V13.1.0 (Mar. 2016), Technical Specification, 3rd Generation Partnership Project; Technical Specification Group Radio Access Network; Evolved Universal Terrestrial Radio Access (E-UTRA);Medium Access Control (MAC) protocol specification, (Release 13).
3GPP TS 36.331 V13.1.0 (Mar. 2016), Technical Specification, 3rd Generation Partnership Project; Technical Specification Group Radio Access Network; Evolved Universal Terrestrial Radio Access (E-UTRA);Radio Resource control (RRC); Protocol specification (Release 13).
R2-152469, 3GPP TSG-RAN WG2 #93bis, Dubrovnik, Croatia, Apr. 11-15, 2016, Agenda item: 8.1.1, Source: Intel Corporation, Title: Uplink QoS support for LAA.
R2-162429, 3GPP TSG-RAN WG2 Meeting #93bis, Dubrovnik, Croatia Apr. 11-15, 2016, Agenda item: 8.1.1 Source: Huawei, HiSilicon, Title: Considerations on Qos control and UL transmission on LAA SCell.
R2-162368, 3GPP TSG-RAN2#93BIS meeting, Tdoc R2-162368, Dubrovnik, Croatia, Apr. 11-15, 2016 Agenda Item: 8.1.1, Souce: MediaTek Inc., Title: On priority classes for uplink LBT.
R1-163191, 3GPP TSG RAN WG1 meeting #84bis, R1-163191, Busan, Korea Apr. 11-15, 2016, Agenda Item: 7.3.1.5, Source: Institute for Information Industry (III), Title: Discussion on LAA Uplink Channel Access.
R1-163152, 3GPP TSG RAN WG1 Meeting #84bis, Busan, Korea, Apr. 11-15, 2016, Source: Ericsson Title: On Signaling of UL Channel Access Parameters.
R1-163151, 3GPP TSG-RAN WG1#84BIS, Busan, Korea, Apr. 11-15, 2016, Source: Ericsson, Title: Channel Access Procedures for UL Grant for Enhanced LAA.
R1-163150, 3GPP TSG RAN WG1 Meeting #84bis, Busan, Korea, Apr. 11-15, 2016, Source: Ericsson Title: On UL Channel Access Procedures for PUSCH.
R1-162942, 3GPP TSG-RAN1 #84BIS meeting, Busan, South Korea, Apr. 11-15, 2016, Agenda Item: 7.3.1.5, Souce: MediaTek Inc., Title: On priority classes for uplink LBT.
R1-162920, 3GPP TSG RAN WG1 Meeting #84bis, Busan, South Korea, Apr. 11-15, 2016, Title: Channel Access for LAA UL, Source: Nokia, Alcatel-Lucent Shanghai Bell.
R1-162804, 3GPP TSG RAN WG1 Meeting #84bis, Busan, Korea, Apr. 11-15, 2016, Source: NTT DoCoMo, Inc., Title: Discussion on channel access framework for eLAA UL.
R1-160630, 3GPP TSG RAN WG1 meeting #84, St Julian's, Malta, Feb. 15-19, 2016, Source: LG Electronics, Title: LBT schemes in LAA UL.
R1-160741, 3GPP TSG RAN WG1 84 Meeting, St Julian's, Malta, Feb. 15-19, 2016, Agenda Item: 7.3.1.5, Source: Huawei, HiSilicon, Title: Other issues related to LBT for eLAA.
R1-161000, 3GPP TSG RAN WG1 Meeting #84, St. Julian's, Malta, Feb. 15-19, 2016, Source: Ericsson Title: On Coordinated UL Channel Access for Enhanced LAA.
R1-162328, 3GPP TSG RAN WG1 Meeting #84bis, Busan, Korea,Apr. 11-15, 2016, Agenda Item: 7.3.1.5, Source: ZTE Microelectronics Technology, Nubia Technology, Title: Discussion on the UL LBT for LAA.
R1-162359, 3GPP TSG RAN WG1 Meeting #84bis, Busan, Korea, Apr. 11-15, 2016, Agenda item: 7.3.1.5 Source: Intel Corporation, Title: UL LBT details.
R1-162555, 3GPP TSG RAN WG1 Meeting #84bis, Busan, Korea, Apr. 11-15, 2016, Agenda item: 7.3.1.5, Source: Sony, Title: UL Channel access mechanism design in eLAA.
R1-162575, 3GPP TSG RAN WG1 Meeting #84bis, Busan, Korea, Apr. 11-15, 2016, Agenda item: 7.3.1.5 Source: Intel Corporation, Title: LBT for UL grant transmission.
R1-162603, 3GPP TSG RAN WG1 84bis Meeting, Busan, Korea, Apr. 11-15, 2016, Agenda Item: 7.3.1.5 Source: Huawei, HiSilicon, Title: Other issues related to LBT for eLAA.
R1-162671, 3GPP TSG RAN WG1 Meeting #84bis, Busan, Korea Apr. 11-15, 2016, Agenda item: 7.3.1.5 Source: Samsung, Title: Discussion on LBT for self-carrier scheduling.
R1-162732, 3GPP TSG RAN WG1 Meeting #84, Busan, Korea, Apr. 11-15, 2016, Agenda Item: 7.3.1.5 Source: Lenovo, Title: LBT mechanism for LAA uplink.
R2-162858, 3GPP TSG-RAN WG2 Meeting #93bis, Dubrovnik, Croatia, Apr. 11-15, 2016, Agenda item: 8.1.1 (LTE_eLAA-Core), Source: LG Electronics Inc., Title: Logical Channel Prioritization in LAA.

* cited by examiner

Example uplink physical channel

Example uplink modulation

Example downlink physical channel

Example downlink physical channel

Dual-Connectivity at eNB

Dual-Connectivity- two MAC entities at UE side

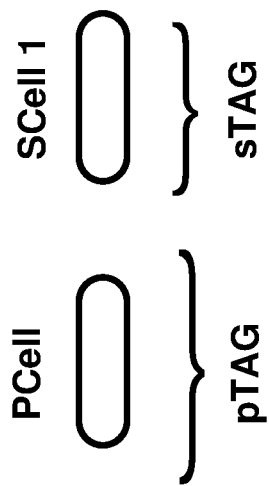
Example 1:
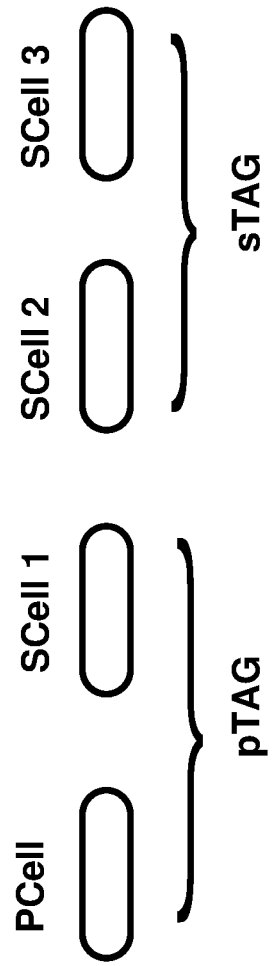
Example 2:
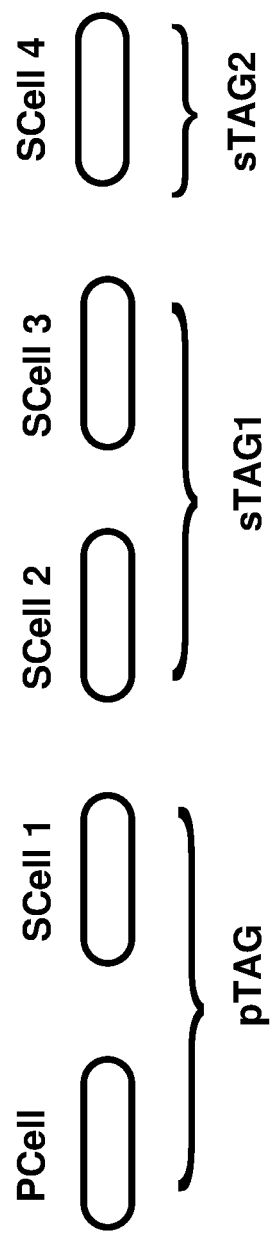
Example 3:
FIG. 8

```
-- ASN1START

LogicalChannelConfig ::=          SEQUENCE {
    ul-SpecificParameters         SEQUENCE {
        priority                      INTEGER (1..16),
        prioritisedBitRate            ENUMERATED {
                                          kBps0, kBps8, kBps16, kBps32, kBps64, kBps128,
                                          kBps256, infinity, kBps512-v1020, kBps1024-v1020,
                                          kBps2048-v1020, spare5, spare4, spare3, spare2,
                                          spare1},
        bucketSizeDuration            ENUMERATED {
                                          ms50, ms100, ms150, ms300, ms500, ms1000, spare2,
                                          spare1},
        logicalChannelGroup           INTEGER (0..3)                         OPTIONAL      -- Need OR
    }                                                                                      -- Cond UL
    OPTIONAL,
    ...,
    [[ logicalChannelSR-Mask-r9       ENUMERATED {setup}                     OPTIONAL      -- Cond SRmask
    ]],
    [[ logicalChannelSR-Prohibit-r12  BOOLEAN                                OPTIONAL      -- Need ON
    ]]
    unlicensed-prohibited             BOOLEAN - OPTIONAL
}

-- ASN1STOP
```

FIG. 11

GROUPING UPLINK GRANTS AND LISTEN BEFORE TALK CLASSES

CROSS-REFERENCE TO RELATED APPLICATION

This application is a Continuation of Ser. No. 15/583,024, filed May 1, 2017, which claims the benefit of U.S. Provisional Application No. 62/329,844, filed Apr. 29, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 8 shows example TAG configurations as per an aspect of an embodiment of the present disclosure.

FIG. 11 is an example logical channel configuration information element as per an aspect of an embodiment of the present disclosure.

DETAILED DESCRIPTION OF EMBODIMENTS

Figure 1:
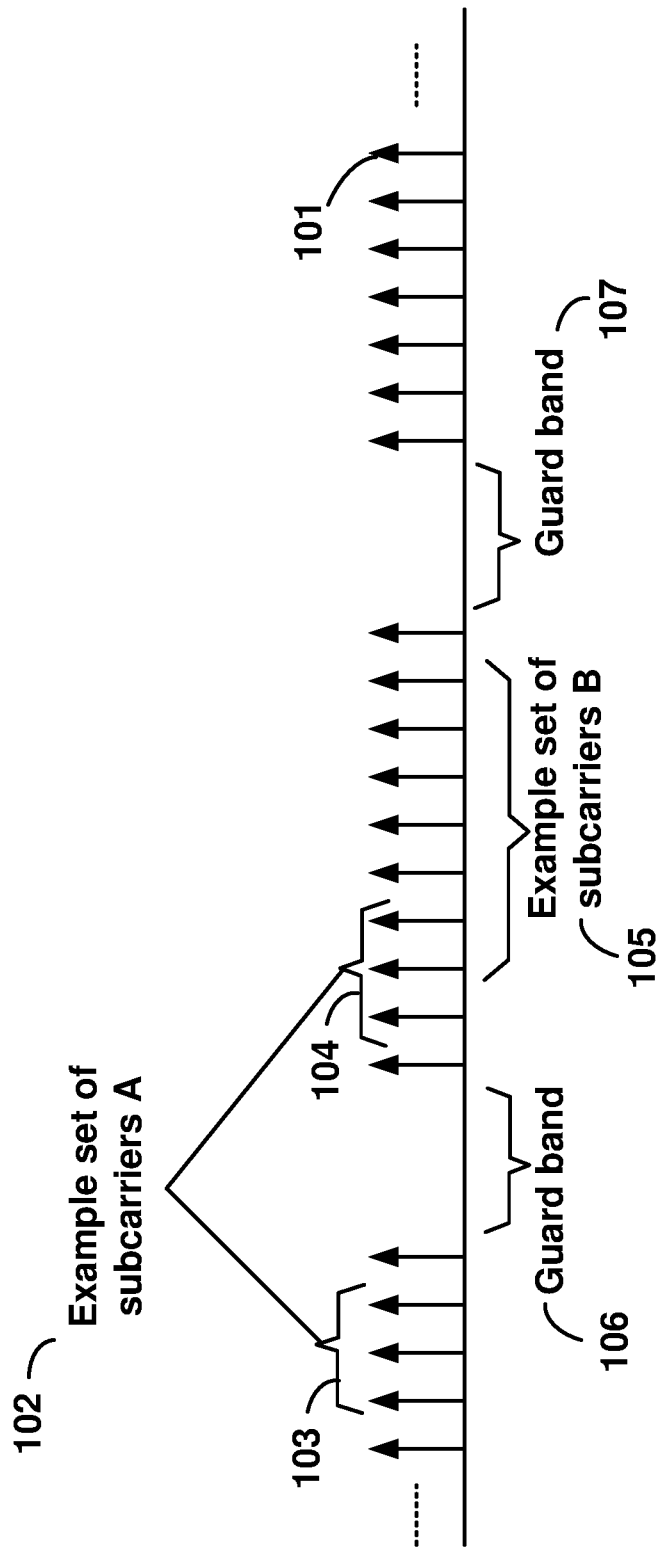
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
DL
DCI downlink control information
DC connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
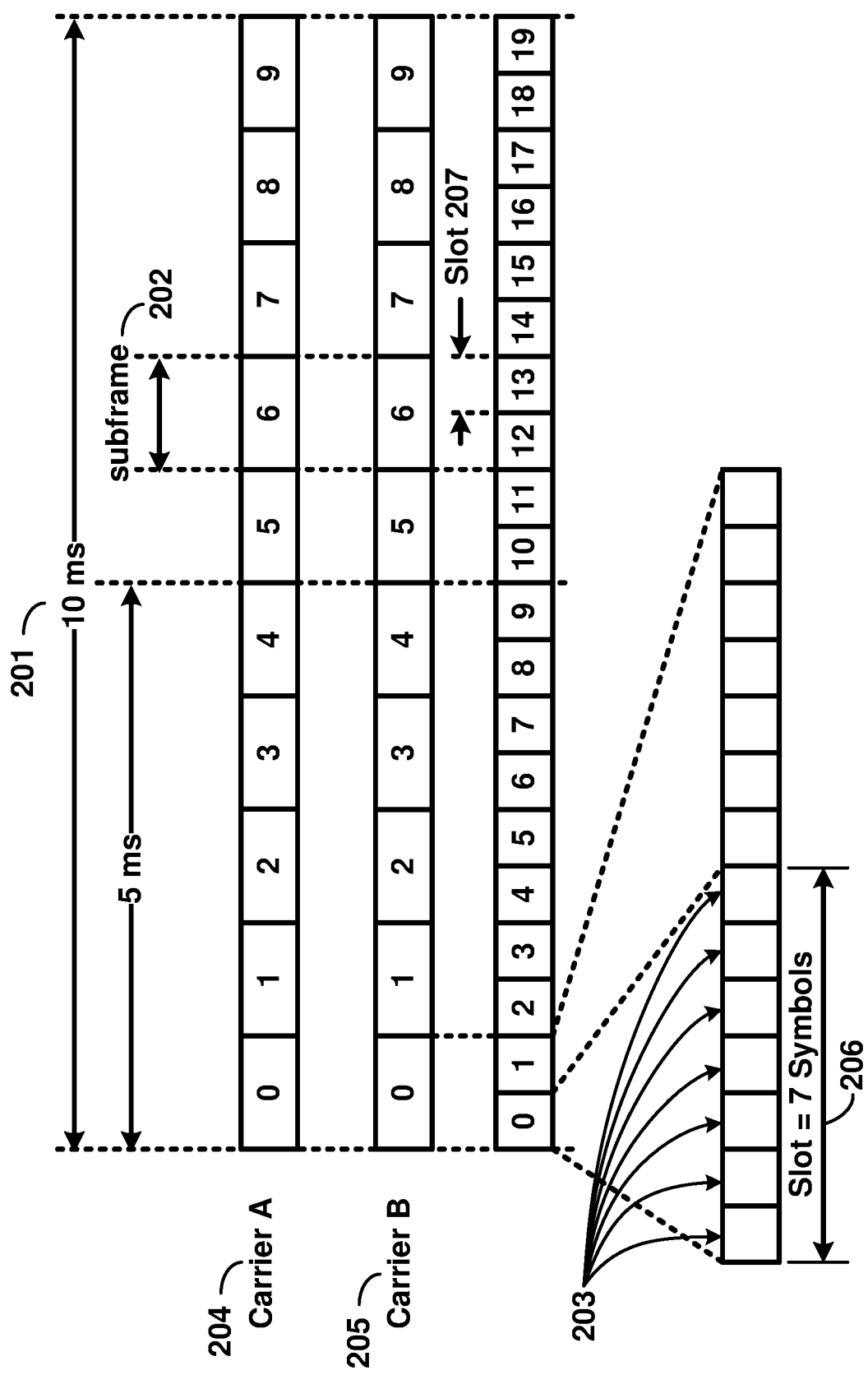
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
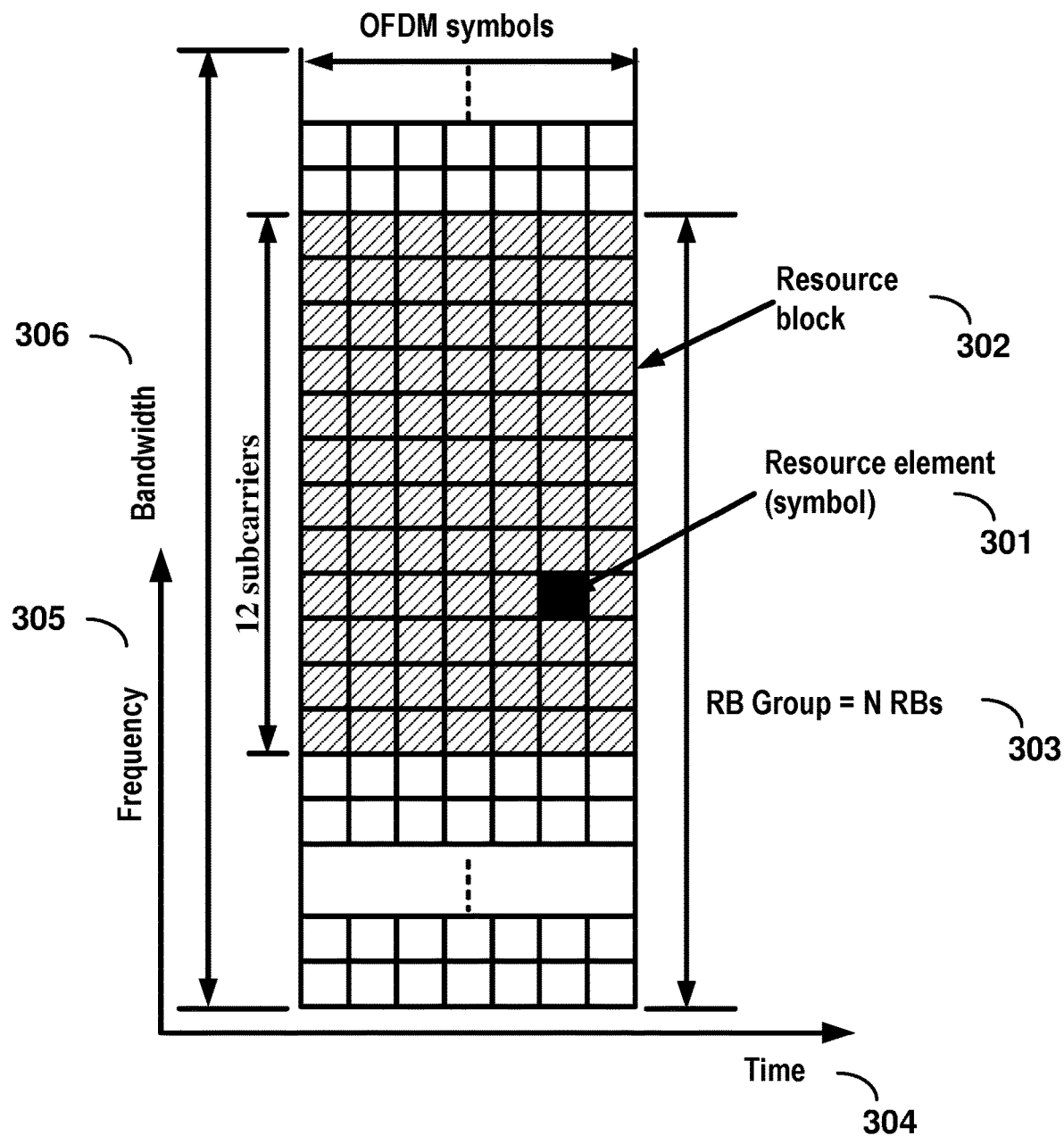
FIG. 3 is an example diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a carrier.

Figure 5A:
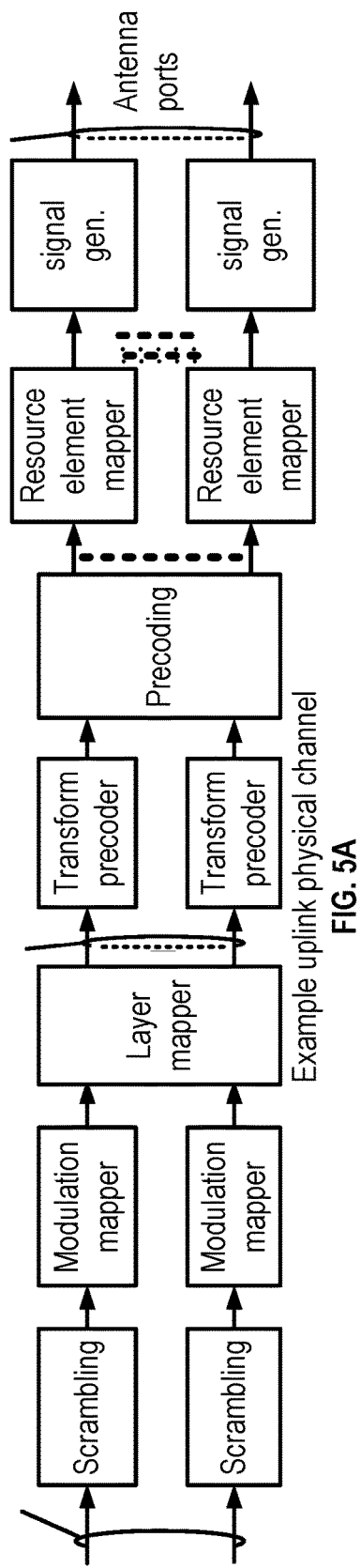
FIG. 5A, FIG. 5B, FIG. 5C and FIG. 5D are example diagrams for uplink and downlink signal transmission as per an aspect of an embodiment of the present disclosure.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Figure 5B:
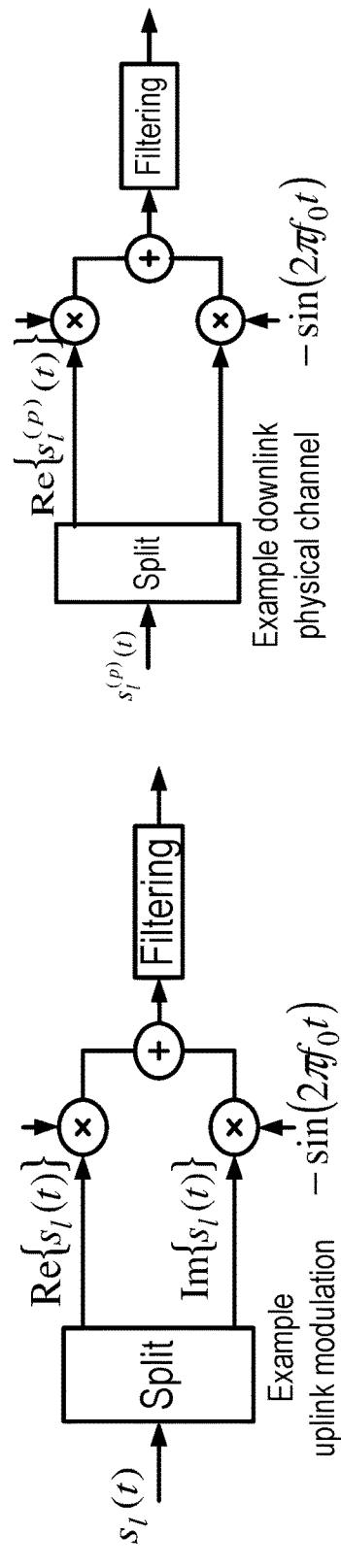

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

Figure 5D:
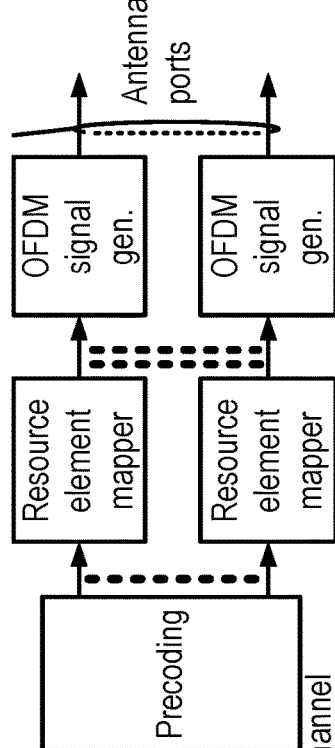
Figure 5C:
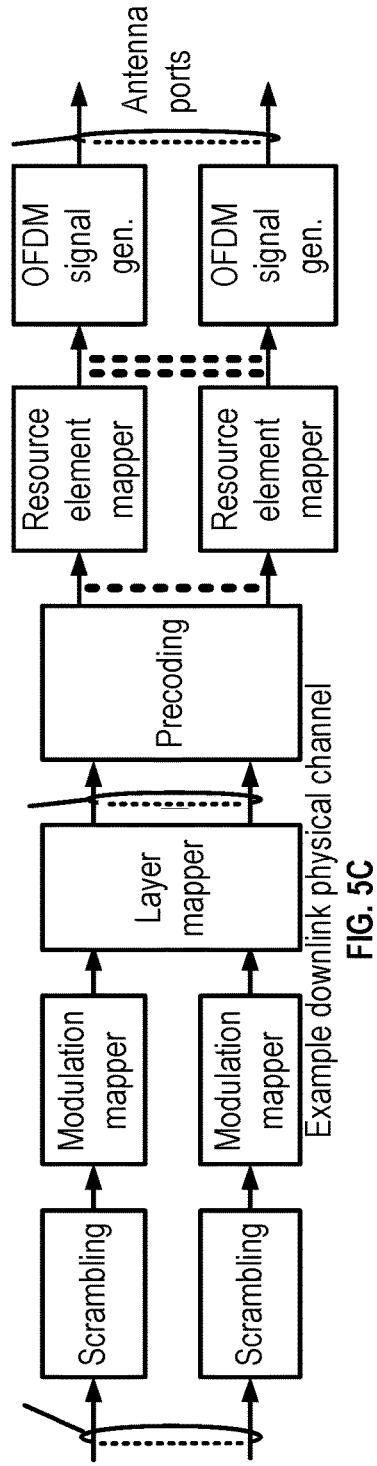

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
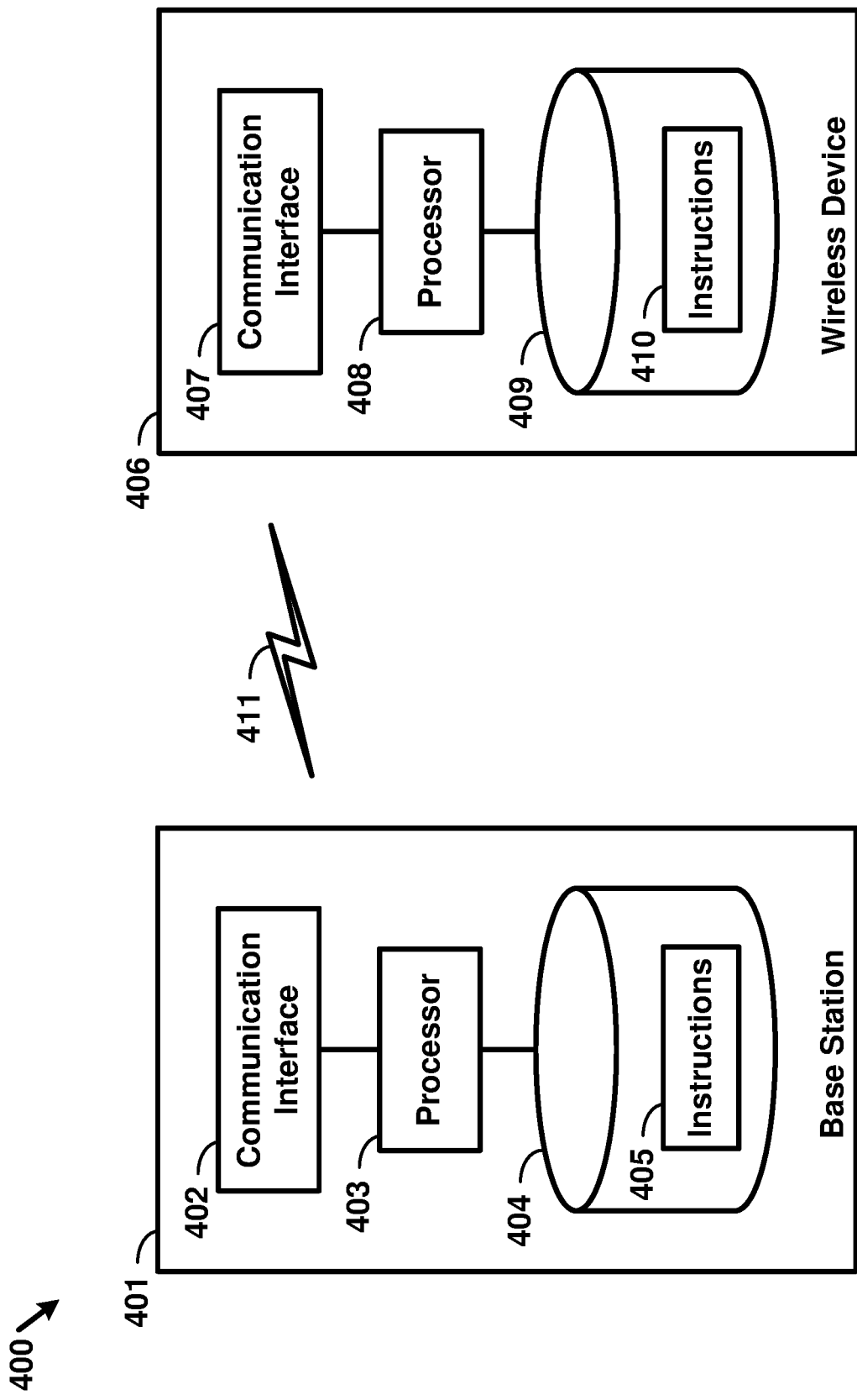
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, a network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface or an Xn interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
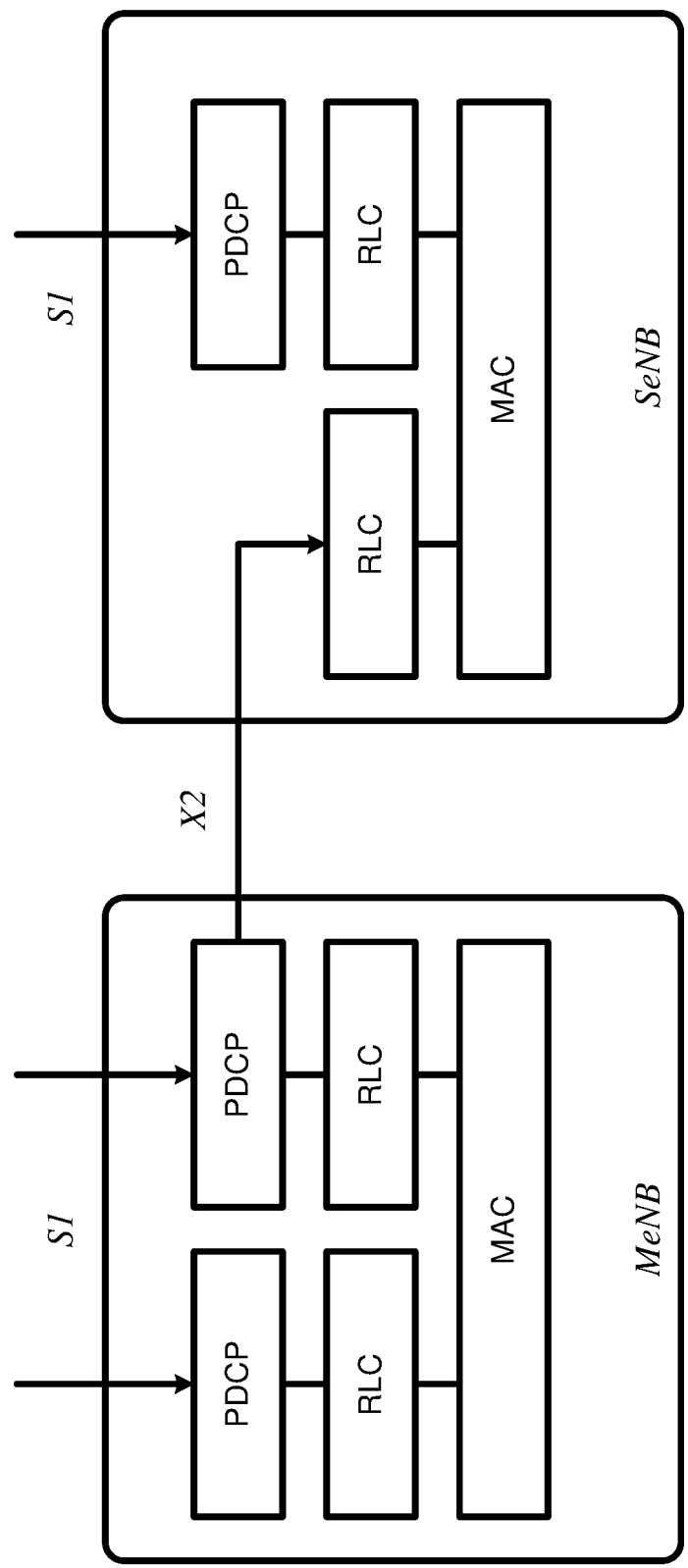
FIG. 6 is an example diagram for a protocol structure with CA and DC as per an aspect of an embodiment of the present disclosure.
Figure 7:
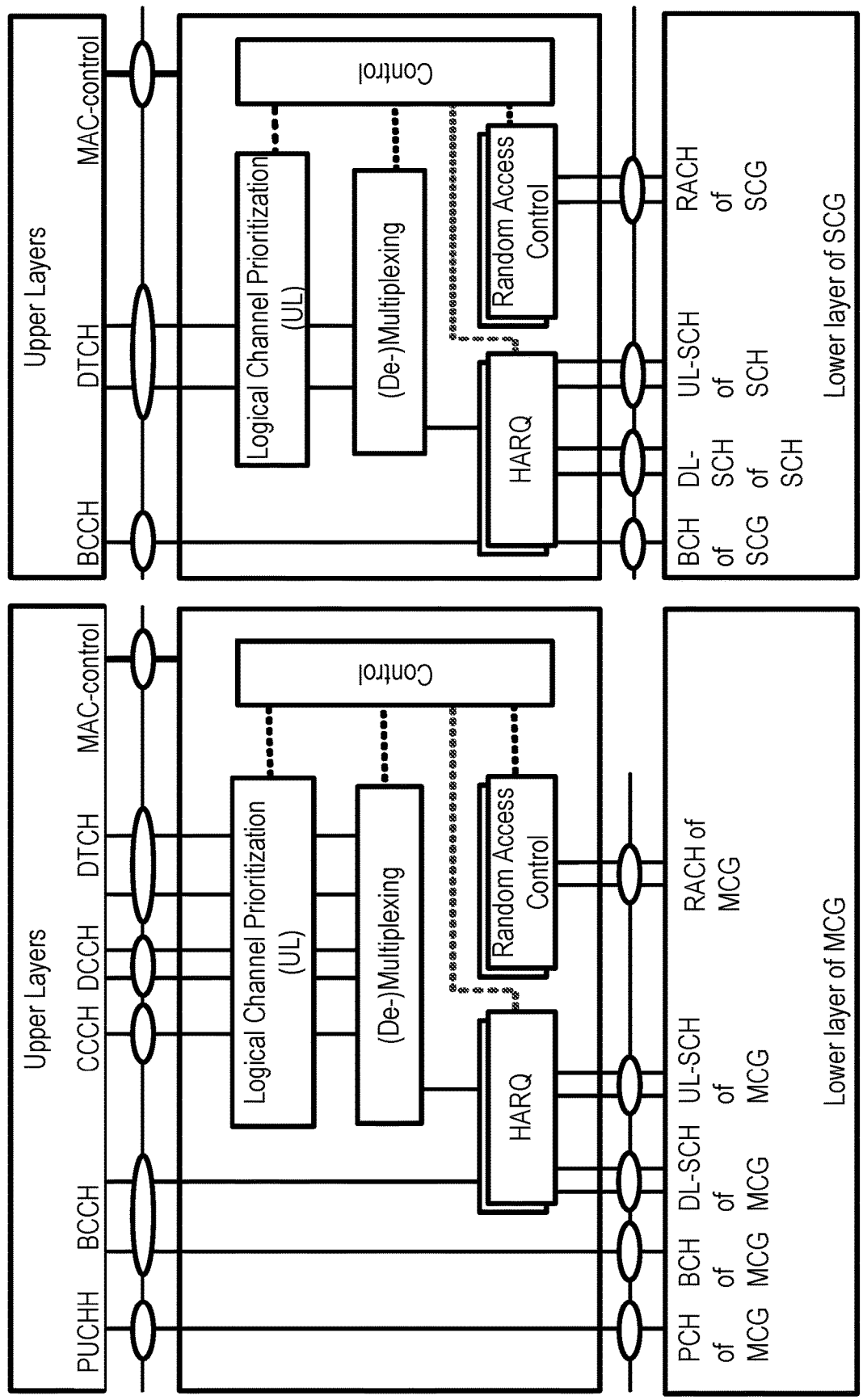
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
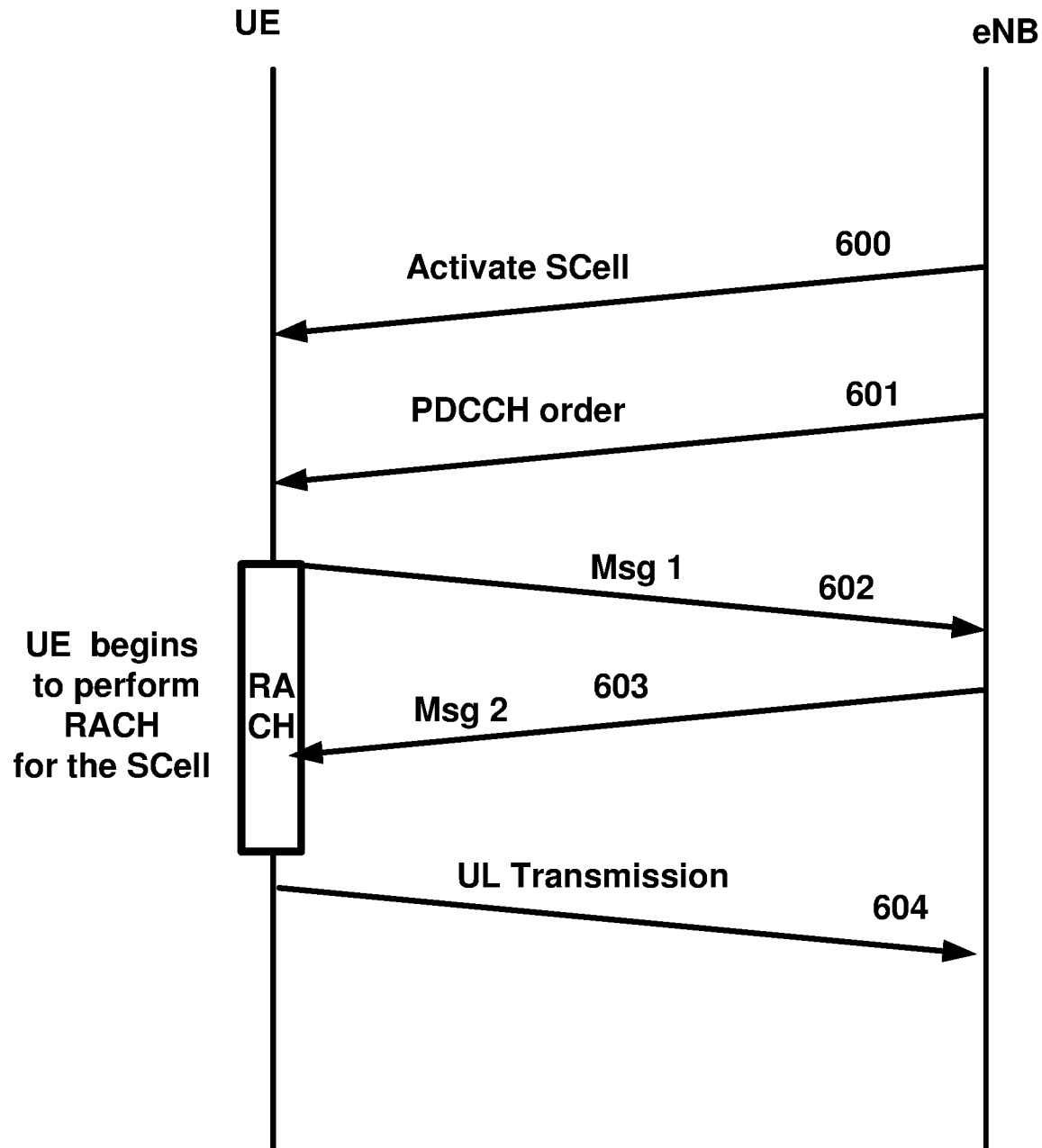
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer may be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
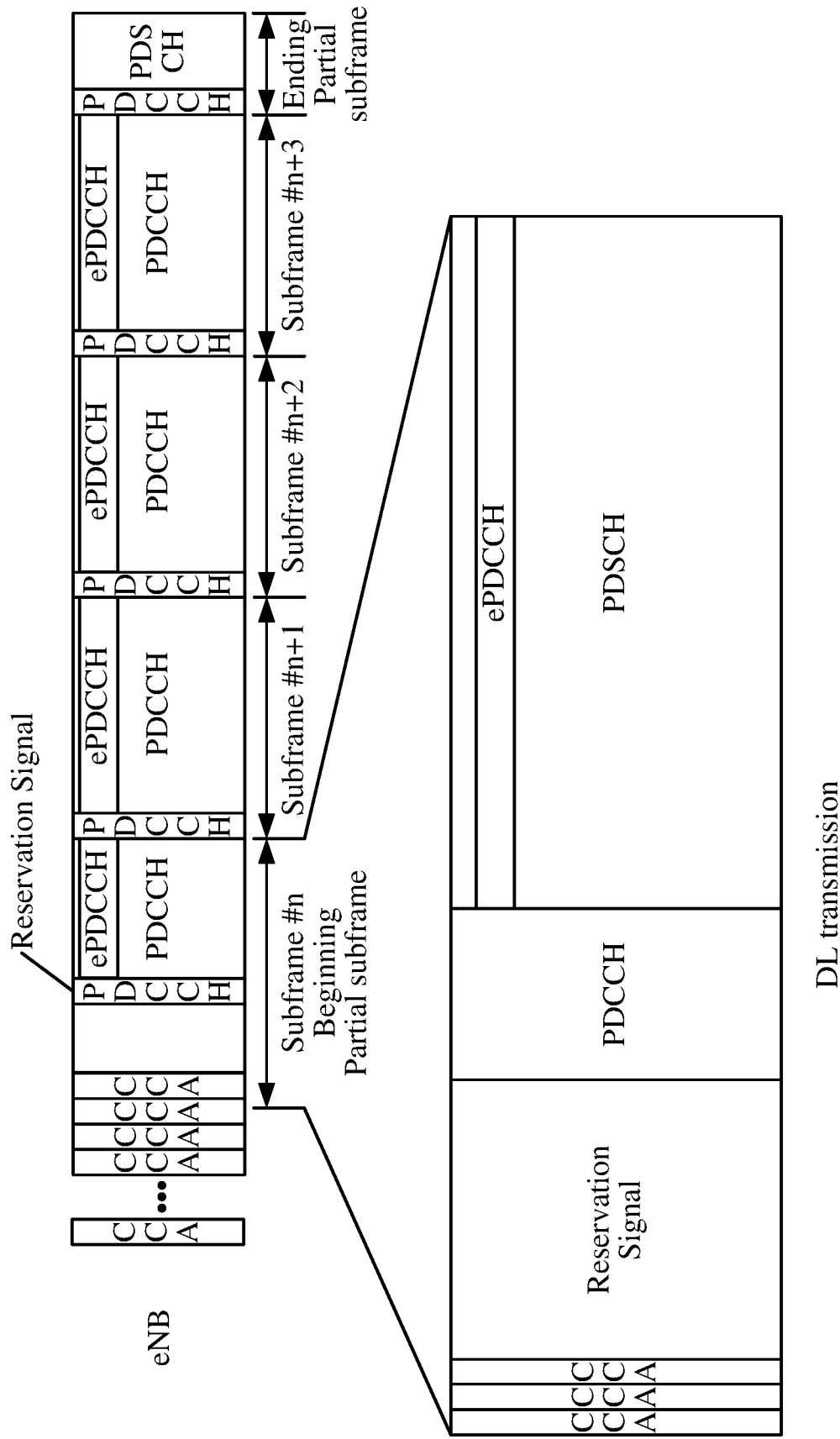
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

In an example, an eNB and/or UE may support a plurality of radio resource types. In an example, various radio resource types may be configured with various TTIs and/or numerologies. In an example, a first radio resource type may operate using at least one first TTI/numerology and a second radio resource type may operate using at least one second TTI/numerology. In an example, various resource types may operate in different frequencies or frequency bands. In an example, a first radio resource type may operate on one or more licensed cells and a second radio resource type may operate on one or more unlicensed cells. An example may use a combination of various features to determine a radio resource type, e.g. frequency, TTI/numerology, frequency band type, etc. Some of the example embodiments are provided for licensed and unlicensed (e.g. LAA cells) radio resource types. These examples may equally apply when other radio resource types are implemented, e.g., based on TTI/numerology.

The term eNB used in the various embodiments in this specification may refer to a base station in an LTE network or an enhanced LTE (eLTE) network or a 5G network.

In an example, when operating on LAA UL-carriers, the UE may perform an LBT process. The UE may monitor the channel. If the channel is free, the UE may transmit. If the channel is occupied, the UE may not transmit a transport block (TB). The monitoring period may be in the order of microseconds. After receiving a grant, the UE may have a limited time (e.g., in the order of milliseconds) to build a MAC PDU and deliver the TB to physical layer (PHY). In an example, the UE may not be capable of building a MAC PDU on a microsecond level. The MAC may already have built the MAC PDU and have sent the MAC PDY to PHY before LBT is performed. In an example, it may not be feasible for a UE to first evaluate if a channel is free and then start building the MAC PDU. The LBT mechanism may be located below MAC (e.g. in PHY). In an example, higher layers (e.g. MAC) may not know the outcome of LBT when building respective protocol data units (PDUs). In an example, the PHY may not need an indication from MAC to perform LBT. PHY may be aware if a transmission needs to be performed as PHY may be aware of scheduling and may also receive a TB from MAC prior to the transmission. PHY may perform LBT without a request from MAC.

In an example, higher layers in a UE may need to know whether a transmission was performed or not (e.g., due to LBT) after a transmission is attempted. For example, in the case of a random-access preamble transmission dropping due to LBT, the MAC layer may need to know whether a preamble was transmitted or not. A similar procedure to Dual Connectivity may be employed where PHY indicates to MAC whether a planned preamble transmission was dropped due to power limitation. PHY may indicate to higher layers whether a transmission has been dropped due to LBT.

In 3GPP release 13, for downlink LAA, four Channel Access Priority Classes were defined. In an example implementation, uplink LAA may reuse the four Channel Access Priority Classes that are defined for downlink LAA.

In an example, a UE may determine an LBT priority class for an uplink, e.g., the UE may use the LBT priority class indicated by an UL grant (e.g., signaled in downlink), or the UE may select the LBT priority class based on a predetermined rule. In an example, the LBT priority class selected for uplink transmission in unlicensed carriers may be determined based on the QoS requirements of the data carried in the transmission.

In legacy LTE release 13 and before, the eNB may perform scheduling so that QoS requirements for data radio bearers (DRBs) are met in both downlink and uplink. In the uplink, the eNB may control the scheduling of uplink data by configuring the following parameters for a logical channel (e.g. mapped one-to-one to a DRB) at the MAC layer: Priority, Prioritized Bit Rate (PBR), and Bucket Size Duration (BSD). The UE may apply a logical channel prioritization (LCP) procedure to construct a MAC PDU based on these configured values. The LCP procedure may allow QoS sensitive traffic to be prioritized and ensure that QoS tolerant traffic is not completely starved. An example embodiment enhances the existing Logical Channel Prioritization (LCP) procedure for assembling MAC PDUs for enhanced LAA.

In an example, the eNB may not be fully able to predict the QoS class of the data that is eventually transmitted over an unlicensed carrier. For example, current LCP rules may not always result in the most QoS sensitive data to be selected for transmission. In order to enable fairness, the LCP mechanism may prevent higher priority logical channels from exhausting every grant from the eNB based on PBR and BSD parameters. The QoS sensitive data may have been sent over a licensed carrier before LBT is successful, leaving relatively QoS tolerant data for transmission over unlicensed carrier. In an example, a UE may decide the uplink LBT priority class to enable consistency between the selected LBT priority class and the QoS requirements of the associated data.

In an example embodiment, the eNB may not signal an LBT value to a UE. The UE may use the LCP procedure to construct the MAC PDU. The resulting MAC PDU may contain data from different logical channels/DRBs.

In an example embodiment, there may be a mapping from a QoS class identifier (QCI) to a priority class. The UE may pick an LBT priority class corresponding to the most QoS sensitive data. For example, let b1, . . . , bn be the DRBs represented in the MAC PDU. Let P1, . . . , Pn be the LBT priority class values corresponding to these DRBs, e.g., by mapping their respective QCI value to LBT priority class. The LBT priority class P employed by the UE for transmitting this particular MAC PDU may be P=min(P1, . . . , Pn).

In an example embodiment, the LBT priority class for a logical channel may be mapped from the logical channel priority configured by the eNB. In an example, let P1, . . . , Pn be the LBT priority class values for the logical channels represented in the MAC PDU, obtained by mapping their respective logical channel priority value to LBT priority class. The LBT priority class P employed by the UE for transmitting this particular MAC PDU may be P=min (P1, . . . , Pn).

In an example, the QCI for a DRB may be signaled by NAS messaging and may not be by the eNB. The logical channel priority may be configured for a logical channel by the eNB and may be reconfigured as per an eNB policy. Using logical channel priority as a criteria for determining uplink LBT class may provide more flexibility and control to the eNB. Logical channel priority of a logical channel (along with other link layer protocol configuration parameters) may be determined (e.g., in the eNB) by a QCI value of the associated DRB, so there may not be much difference in using either a QCI or a logical channel priority for mapping uplink LBT priority class. When the eNB does not signal an uplink LBT priority class value to use for single subframe PUSCH transmission, either the QCI or the logical channel priority based LBT priority class determination scheme may be employed by the UE to determine the uplink LBT priority class.

In an example, the eNB may signal the LBT priority class, either explicitly or implicitly. In an example, the MAC PDU may be constructed using an LCP procedure. Let $P_{eNB}$ be the uplink LBT priority class indicated by the eNB. In an example, a UE may perform uplink LBT with indicated LBT priority ($P_{eNB}$). In an example, let $P_{UE}$ be the priority value determined using the QCI or logical channel priority based methods described above. The LBT priority value employed by the UE may be P=max($P_{eNB}$, $P_{UE}$).

In an example implementation, for multi-subframe transmissions using a Category-4 LBT, the choice of an LBT class and transmission duration may satisfy restrictions on maximum channel occupancy time per LBT class. The Category-4 LBT may be performed for the first subframe of a consecutive multi-subframe transmission over unlicensed PUSCH.

In an example, an eNB may indicate an LBT priority class value and a transmission duration to a UE either explicitly or implicitly. For example, the eNB may indicate the LBT priority. The UE may assume that the transmission duration is limited by the corresponding maximum channel occupancy time (MCOT) value. In an example, the eNB may indicate the transmission duration, and the UE may assume the LBT priority class to use is the most aggressive LBT priority class whose MCOT is equal to or larger than the indicated transmission duration. A table including LBT priorities and MCOT values may be configured in the UE.

In an example, QoS support may be implemented using radio bearers in an air interface. In release 13 of 3GPP carrier aggregation, a radio bearer may be transmitted/received on any serving cell, and there may be no special handling for QoS since there may be no major difference in the radio environments on serving cells. When an UL LAA is configured, there may be a desire to enhance the current handling for QoS. Example embodiments existing MAC and QoS mechanisms to enable more efficient QoS management when UL LAA is configured.

The radio environment in an unlicensed spectrum may be quite different compared with that in a licensed spectrum. In a spectrum, there may be various sources for interference which may be outside the control of an operator, e.g., other radio access technologies (RATs) (e.g. Wi-Fi) or LAA-capable eNB and/or UEs of other operators, etc. The unlicensed carrier might be switched off due to very strong interference. In addition, LBT may be supported to meet regulatory requirements. This may impact QoS of some bearers, e.g. latency requirements might not be satisfied. Examples of such bearers may comprise voice, real time gaming, SRB, combinations thereof, and/or the like. In an example, QoS of services like a best-effort service may not be impacted when operating on LAA cells.

Consider a bearer carried over radio link control (RLC) unacknowledged mode (UM). Whenever there is a UL grant in one of the serving cells, a UE may apply logical channel prioritization to decide how to utilize the UL grant. In 3GPP release 13, the UE may not distinguish between on which carrier it receives the UL grant. It may be possible that the UE transmits data of a delay sensitive service on unlicensed spectrum, and some packets may be lost due to unstable radio conditions and/or more latency may be expected to successfully complete HARQ operation(s). Therefore, the delay requirement may not be satisfied due to unstable radio conditions in unlicensed spectrum.

In an example embodiment, bearers/logical channels and/or MAC Control Elements may be configured as to whether they may be offloaded to LAA SCells or whether they may only be served by licensed carriers. Because of LBT for UL transmission, there may be no guarantee that a packet sent over an LAA SCell will be received within some time limit. In an example, data from delay sensitive bearers (e.g. voice, RRC signaling) may not be transmitted over the UL LAA SCells.

In an example, a bearer may be configured to either use the UL grant for UL LAA SCells only or for licensed serving cells only or for any serving cells. In an example, a bearer may be configured to use UL grants only for UL licensed serving cells. Otherwise, it may use the UL grants from any serving cells as per legacy.

In an example, in order for an eNB to know what UL grant to provide (e.g., for unlicensed or licensed serving cells), the UE may need to inform the eNB which bearers have UL data for transmission. In the existing LTE, the UE may send Buffer Status Reporting (BSR) to the eNB. The Buffer Status report may include a logical channel group ID and its corresponding UL buffer status. For example, a 2-bit logical channel group ID (LCGID) may be eNB configured to group the logical channels of the same or similar QoS in one group ID. This may allow the eNB to perform inter and intra UE prioritization for allocating UL resources. In an example, LCGID may be reused or extended to take into account logical channels that may use the UL grants only for the UL licensed cells and the logical channels that may use the UL grants for both the UL LAA SCells and other licensed UL serving cells.

In an example, LCGID #0 may be employed for RRC signaling and/or delay sensitive services (e.g. voice, streaming video). If a UE's serving cells comprise a UL LAA SCell and the BSR indicates only the buffer status from LCGID #0, the eNB may not allocate a UL grant from the LAA SCell to the UE. In an example, to achieve the inter- and intra-UE prioritization from the eNB perspective, the UL resources for PUSCH may be classified as licensed carrier and unlicensed carrier. For UL resources for PUSCH in licensed carrier, LCGID #0 (regardless of whether the UE has UL LAA SCell) may be considered higher priority than other LCGIDs by the eNB scheduler. The UEs with LCGID #0 configured may be scheduled using legacy approaches (e.g. round-robin, etc.). For UL resources for PUSCH in an unlicensed carrier, the eNB may schedule the UL resources based on eNB implementation setting of priority for the LCG #1 to #3.

In an example implementation, there may be one BSR for logical channels that may only use UL grants for licensed serving cells and another BSR for logical channels that may use both. A BSR may be triggered by separate BSR procedures.

In an example embodiment, a UE may include more information in the BSR to differentiate between buffer status of logical channels that may use only the UL grant of the UL licensed serving cells and the buffer status of logical channels that may use the UL grant for both UL LAA SCells and the licensed UL serving cells.

In an example, a Logical Channel Prioritization (LCP) procedure may be applied when a new transmission is performed. In order for the UE MAC to differentiate whether a new transmission is on a UL LAA SCell or on a UL serving cell, layer 1 (L1) may indicate to the MAC layer whether a UL grant is for a UL LAA SCell or for a licensed serving cell. In an example, for a new transmission on a UL LAA SCell, the UE MAC entity may apply the logical channel prioritization procedure on the logical channels configured by RRC that may use the UL grants for both the UL LAA SCells and the licensed UL serving cells. The logical channels that may only use the UL grants for the licensed UL serving cells may not be considered for the new transmission on a UL LAA SCell.

In an example, RRC may control the scheduling of uplink data by configuring a logical channel with one or more parameters. The one or more parameters may comprise: priority where an increasing priority value may indicate a lower priority level, prioritisedBitRate which may set the Prioritized Bit Rate (PBR), and bucketSizeDuration which may set the Bucket Size Duration (BSD).

In an example, a MAC entity may maintain a variable Bj for a logical channel j. Bj may be initialized to zero when the logical channel j is established, and incremented by the product PBR×TTI duration for a transmission time interval (TTI), where PBR is a Prioritized Bit Rate of logical channel j. The value of Bj may not exceed the bucket size. If the value of Bj is larger than the bucket size of logical channel j, it may be set to the bucket size. The bucket size of a logical channel is equal to PBR×BSD, where PBR and BSD may be configured by upper layers.

FIG. 11 is an example IE LogicalChannelConfig information element for configuring the logical channel parameters. In an example, bucketSizeDuration may indicate a Bucket Size Duration for logical channel prioritization. Value may be in milliseconds. Value equal to ms50 may correspond to 50 ms, ms100 may correspond to 100 ms, and so on. The logicalChannelGroup may map a logical channel to a logical channel group for BSR reporting. The logicalChannelSR-Mask may control scheduling request (SR) triggering on a logical channel basis when an uplink grant is configured. The logicalChannelSR-Prohibit may comprise a value of TRUE or FALSE. The value TRUE may indicate that the logicalChannelSR-ProhibitTimer is enabled for the logical channel E-UTRAN may optionally configure the field (i.e. indicate value TRUE) if logicalChannelSR-ProhibitTimer is configured. The prioritisedBitRate may indicate Prioritized Bit Rate for logical channel prioritization. The value of prioritisedBitRate may be in kilobytes/second. Value kBps0 may correspond to 0 kB/second, kBps8 may correspond to 8 kB/second, kBps16 may correspond to 16 kB/second, and so on. The value infinity may be applicable for SRB1 and SRB2 signaling radio bearers. The parameter priority may indicate a logical channel priority. The value of priority may be an integer. The parameter unlicensed-prohibited may indicate a logical channel mapping restriction. In an example, value TRUE may indicate that the data in logical channel may not be transmitted over unlicensed cells.

In an example implementation, a UE may follow one or more rules during scheduling procedures. An example rule may be that the UE may not segment an RLC SDU (or partially transmitted SDU or retransmitted RLC PDU) if the whole SDU (or partially transmitted SDU or retransmitted RLC PDU) fits into the remaining resources of the associated MAC entity. In an example, if the UE segments an RLC SDU from the logical channel, it may maximize the size of the segment to fill the grant of the associated MAC entity as much as possible. In an example, the UE may maximize the transmission of data. If the MAC entity is given a UL grant size that is equal to or larger than 4 bytes while having data available for transmission, the MAC entity may not transmit only padding BSR and/or padding (unless the UL grant size is less than 7 bytes and an AMD PDU segment needs to be transmitted). The MAC entity may not transmit data for a logical channel corresponding to a radio bearer that is suspended.

In an example Logical Channel Prioritization procedure, the MAC entity may take into account the following relative priority in decreasing order: MAC control element for C-RNTI or data from UL-CCCH; MAC control element for BSR, with exception of BSR included for padding; MAC control element for PHR, Extended PHR, or Dual Connectivity PHR; MAC control element for Sidelink BSR, with exception of Sidelink BSR included for padding; data from any Logical Channel, except data from UL-CCCH; MAC control element for BSR included for padding; MAC control element for Sidelink BSR included for padding.

In an example embodiment, some bearers/logical channels may only be transmitted via licensed cells, and some bearers/logical channels may be transmitted via both licensed and unlicensed cells. In an example, an eNB may signal a UE (e.g., by RRC configuration and/or dynamic signaling) which logical channel(s)/bearer(s) may only be sent only on the licensed cells.

In an example, a listen-before-talk (LBT) priority class may correspond to one or more logical channels. A logical channel may have a one-to-one relation with a LBT priority class. In an example, the eNB may indicate the LBT priority to be applied before transmission of a UE on a LAA SCell. The indication may be in a common DCI or uplink grant and the UE may allocate resources on the LAA SCell to the logical channel(s) that correspond to the indicated LBT priority class. In an implementation, the MAC entity of a UE may construct the MAC PDU(s) for a subframe or a burst on a LAA SCell from logical channels that correspond to the LBT priority class indicated by eNB and/or LBT priority classes with stricter LBT requirements. In an implementation, the MAC entity of a UE may start transmission of a burst on a LAA SCell with logical channel(s) that correspond to the indicated LBT priority class. Once the buffer(s) for this (these) logical channel(s) is(are) emptied, the UE may continue transmission in the burst and/or subframe with data from logical channel(s) that correspond to stricter LBT requirements.

In an example, a UE may autonomously decide which LBT priority class to apply before transmission on a LAA SCell based on the content of its transmission on the LAA SCell in a TTI or a burst (e.g., the logical channels that are multiplexed in a TTI or burst) and/or other criteria. In an example, the MAC PDU(s) transmitted on a LAA SCell may comprise multiple logical channels with different LBT priority requirements. In one implementation, a UE may autonomously decide on a LBT priority class and transmit logical channel(s) that correspond to the LBT priority class.

In an implementation, a UE may start allocating resources on a LAA SCell to the logical channel(s) that correspond to the LBT priority class indicated by eNB, even if one or more of these logical channels have a value of Bj≤0. In an implementation, a UE may start allocating resources on a LAA SCell to a subset of logical channel(s) that correspond to the indicated LBT priority with Bj>0.

In an example, a UE may have an uplink rate control function which manages the sharing of uplink resources between radio bearers. RRC may control the uplink rate control function by giving a bearer a priority and a prioritized bit rate (PBR). In an example, the values signalled may not be related to the ones signalled via S1 to the eNB. In an example, the uplink rate control function may enable the UE to serve its radio bearer(s) as follows. The radio bearer(s) may be served in decreasing priority order up to their PBR. The radio bearer(s) may be served in decreasing priority order for the remaining resources assigned by the grant. In case the PBRs are set to zero, the radio bearer(s) may be served in strict priority order. In an example, the UE may maximize the transmission of higher priority data. By limiting the total grant to the UE, the eNB may control that the UE-AMBR plus the sum of MBRs is not exceeded. The eNB may enforce the MBR of an uplink radio bearer by triggering congestion indications towards higher layers and by shaping the data rate towards the S1 interface. In an example, if more than one radio bearer has the same priority, the UE may serve these radio bearers equally.

In an example embodiment, a UE may construct a MAC PDU or several MAC PDUs corresponding to a grant for a LAA SCell. In an example, a UE may determine the LBT priority class to be applied before transmission of the TB(s) based on the content of the MAC PDU(s). In an example, the MAC layer may determine the LBT priority class and indicate it to the PHY layer. In an example, there may be a one-to-one mapping between a logical channel priority and a LBT priority class. A UE may choose the LBT priority class to be the lowest (e.g., least strict) LBT priority class that correspond to the logical channels multiplexed in a MAC PDU.

In an example embodiment, an eNB may signal the LBT priority class to a UE, corresponding to a grant for a LAA SCell, that needs to be applied before transmission on the LAA SCell. In an example, an eNB may signal to a UE, the LBT priority class corresponding to a grant. A UE may group the grants that correspond to the same LBT priority class. In an example, a UE may not group the grants that correspond to different LBT priority classes. In an example, a UE may multiplex logical channel(s) corresponding to the signaled LBT priority class and logical channels corresponding to higher number (e.g., stricter) LBT priority classes during the logical channel prioritization procedure for a grant (or group of grants, e.g., with the same signaled LBT priority class). A higher LBT priority number may result in lower access opportunity for data transmission. In an example, a UE may multiplex logical channel(s) corresponding to the signaled LBT priority class for the grant (or the group of grants, e.g., with the same signaled LBT priority class). In an example, once data from this (these) logical channels are exhausted, the logical channel(s) corresponding to the higher (e.g., stricter) LBT priority classes may be multiplexed during the logical channel prioritization procedure. A UE may continue multiplexing logical channel(s) corresponding to higher LBT priority classes one by one.

In an example Scheduling mechanism, a UE may receive grants for transmission on one or more first radio resource type (e.g., licensed cell(s)) and one or more second radio resource type (e.g., LAA SCell(s)) in a TTI. In an example, the UE may determine an LBT priority class for a grant on LAA SCells, e.g., based on logical channel priority of the data in the corresponding TB.

In the legacy logical channel prioritization procedure in LTE-Advanced, when the MAC entity is requested to transmit multiple MAC PDUs in one TTI, the LCP procedure rules may be applied either to each grant independently or to the sum of the capacities of the grants. Processing each grant independently may decrease uplink multiplexing efficiency and processing the sum of the capacities of the grants may reduce uplink multiplexing efficiency and resource allocation flexibility. The legacy methods may reduce uplink radio link throughput, especially when different grants are for different radio resource types. There is a need to improve uplink multiplexing and logical channel prioritization procedures when grants are for different radio resource types. Furthermore, legacy mechanisms do not take into account the mapping restrictions of logical channels to a plurality resource types indicated the plurality of grants. The legacy method of processing the sum of the capacities of the grants, therefore, may lead to inefficient data multiplexing as a LCP process does not distinguish the difference between resource resources and processes the pooled resources jointly. When legacy methods are implemented and the mapping of the logical channels to the plurality of grants are different, the MAC entity may not efficiently allocate resource from the grouped grant.

Example embodiments provides flexibility and improves radio resource efficiency by grouping grants into a plurality of grouped grants according pre-defined criteria. Grouping mechanisms in example embodiments provide advantages over other types of groupings by considering logical channel mappings and/or radio resource types. Considering logical channel mapping restrictions and/or radio resource types in grouping grants enables a UE to consider RRC logical channel configuration parameters, and resource type and/or priority information indicated by the DCI to enhance uplink multiplexing. Example groupings improves radio resource efficiency by adding flexibility in processing the grants compared with processing each grant separately, processing all the grants together, and/or employing other grouping mechanisms.

Figure 12:
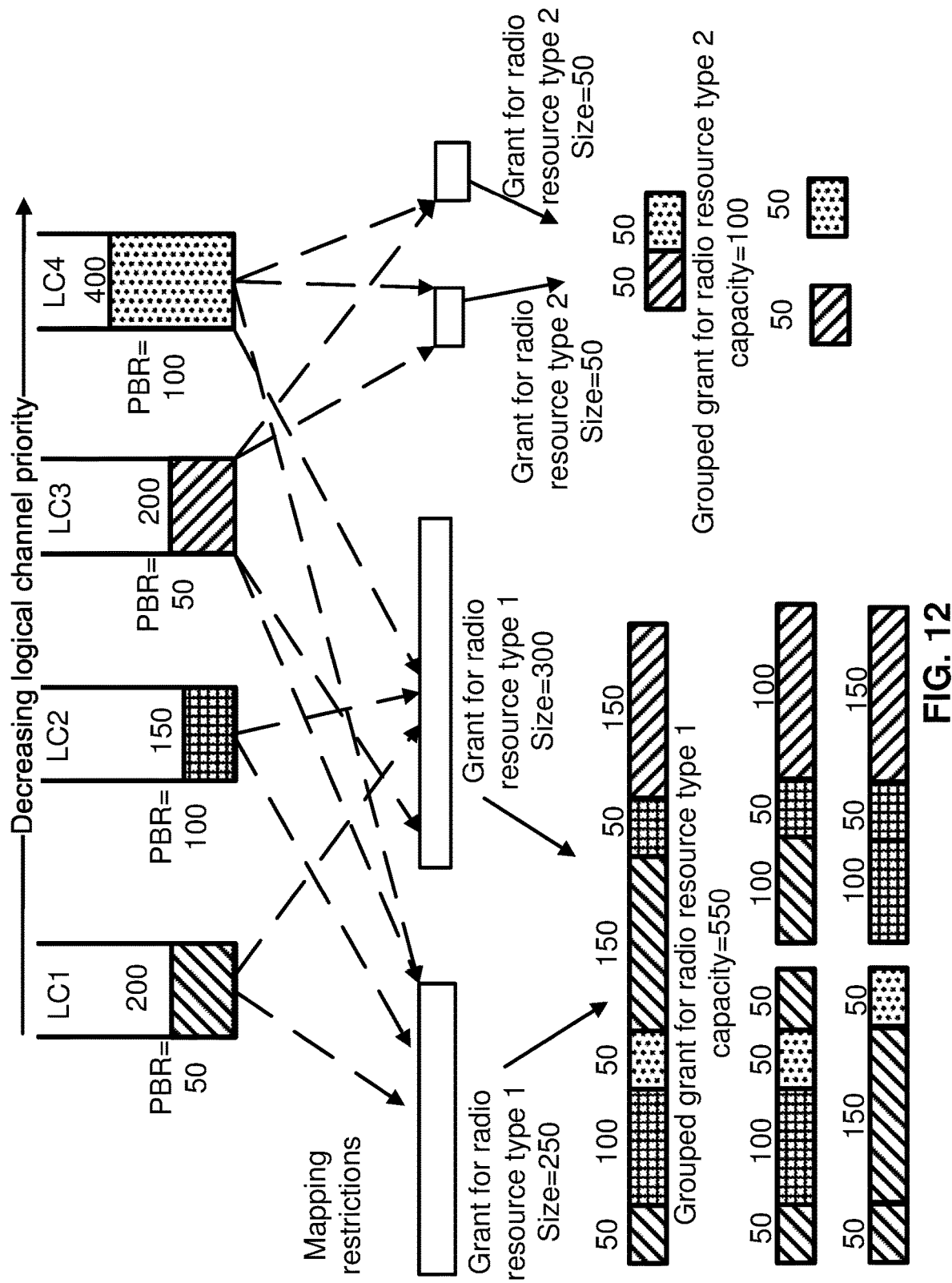
FIG. 12 is an illustration of an example of logical channel prioritization as per an aspect of an embodiment of the present disclosure.

In an example embodiment, the MAC entity may consider both of the grouped grants on second radio resource type (e.g., LAA SCells) (with sum capacity equal to sum of capacities of grants for the second radio resource type) and the grouped grants for the first radio resource type (e.g., licensed cells) (with capacity equal to the sum of the capacity of grants for the first radio resource type) when serving the logical channels (see e.g., FIG. 12).

In an example embodiment, the logical channels with Bj>0 may be allocated resources in a decreasing priority order and a logical channel may be served up to its PBR. In an example, if the PBR of a logical channel is "infinity," the data of the logical channel that is available for transmission may be served. If a logical channel may only be transmitted on the first radio resource type (e.g., licensed cells), the resources from grouped grants on the first radio resource type (e.g., licensed cells) may be allocated. If a logical channel may be transmitted on either the first radio resource type (e.g., licensed cells) or the second radio resource type (e.g., LAA SCells) or both and there are at least as much resources in the grouped grants on the second radio resource type (e.g., LA SCells) to achieve the PBR of the logical channel, the MAC entity may allocate resources from the grouped grants for the second radio resource type. If there are not enough resources in the grouped grants for the second radio resource type (e.g., LAA SCells) to achieve the PBR of the logical channel, the MAC entity may allocate remaining resources from the grouped grants for the second radio resource type (e.g., LAA cells). The MAC entity may allocate resources from the grouped grants for the first radio resource type (e.g., licensed cells) to achieve resource allocation for the logical channel up to the PBR of the logical channel. The allocation of resources from the grouped grants for the first radio resource type may, according to an embodiment, follow the allocation of resources from the grouped grants for the first radio resource type. In an example, the MAC entity may decrement Bj of a logical channel by the total size of MAC SDUs served to logical channel j.

In an example, embodiment, if resources remain in the grouped grants for the second radio resource type (e.g., LAA SCells) or the grouped grants for the first radio resource type (e.g., licensed cells), logical channels, regardless of the value of Bj, may be served in a decreasing priority order. If a logical channel may only be transmitted on the first radio resource type (e.g., licensed cells), the data in the logical channel may be served until either the data or the grouped grants for the first radio resource type (e.g., licensed cells) is exhausted, whichever comes first. If a logical channel may be transmitted on both the first radio resource type (e.g., licensed cells) and the second radio resource type (e.g., LAA SCells), the data in the logical channel may be served until either the data is exhausted or the grouped grants for the first radio resource type (e.g., licensed cells) and the grouped grants for the second radio resource type (e.g., LAA SCells) is exhausted, whichever comes first. In an example, the data in the logical channel may be served starting with the grouped grants for the second radio resource type (e.g., LAA cells) and then the grouped grants for the first radio resource type (e.g., licensed cells).

An example of logical channel prioritization is depicted in FIG. 12. In the example of FIG. 12, it may be assumed that Bj of logical channels may be positive at the start of logical channel prioritization procedure. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example implementation, the MAC entity may allocate resources to the logical channels as follows. The MAC entity may consider both the grouped grants on a second radio resource type (e.g., LAA SCells) (with capacity equal to the the sum of the capacity of grants for the second radio resource type) and the grouped grants for the first radio resource type (e.g., licensed cells) (with capacity equal to the sum of the capacity of grants for the first radio resource type). The logical channels with Bj>0 may be allocated resources in a decreasing priority order. The PBR of a logical channel that may be transmitted on both the first radio resource type (e.g., licensed cells) and the second radio resource type (e.g., LAA SCells) may be first mapped to remaining resources (if any) on the grouped grants for the second radio resource type (e.g., LAA SCells), and then mapped to remaining resources (if any) on the grouped grants for the first radio resource type (e.g., licensed cells). In an example, if the PBR of a logical channel is set to "infinity," the MAC entity may allocate resources for the data that is available for transmission on the logical channel before meeting the PBR of the lower priority logical channel(s). The MAC entity may decrement Bj by the total size of MAC SDUs served to logical channel j above. The value of Bj may be negative. If any resources remain on the grouped grants for the first radio resource type (e.g., licensed cells) or the grouped grants for the second radio resource type (e.g., LAA SCells), the logical channels may be served in a strict decreasing priority order considering the logical channel mapping restriction (regardless of the value of Bj) until either the data for that logical channel or both grouped UL grants are exhausted, whichever comes first. Logical channels configured with equal priority may be served equally.

In an example, a wireless device may receive at least one control packet indicating: at least one first grant in a subframe of one or more first radio resource type (e.g., licensed cells), and at least one second grant in the subframe of one or more second radio resource type (e.g., license-assisted-access (LAA) cells). The wireless device may calculate a first resource type (e.g., licensed) aggregate grant by summing the capacity of the at least one first grant. The wireless device may calculate a second radio resource type (e.g., LAA) aggregate grant by summing the capacity of the at least one first grant. The wireless device may allocate resources to logical channels on the first radio resource aggregate grant and the second radio resource aggregate grant, considering a logical channel mapping restriction. The logical channel mapping restriction may indicate whether a logical channel is prohibited from transmission on a second radio resource type (e.g., an LAA cell).

In an example scheduling mechanism, a UE may receive grants for transmission on one or more first radio resource type (e.g., licensed cell(s)) and one or more second radio resource type (e.g., LAA SCell(s)) in a TTI. In an example, a UE may determine the LBT priority class for the grant(s) on LAA SCells, e.g., based on logical channel priority of the data transmitted in a grant.

Figure 13:
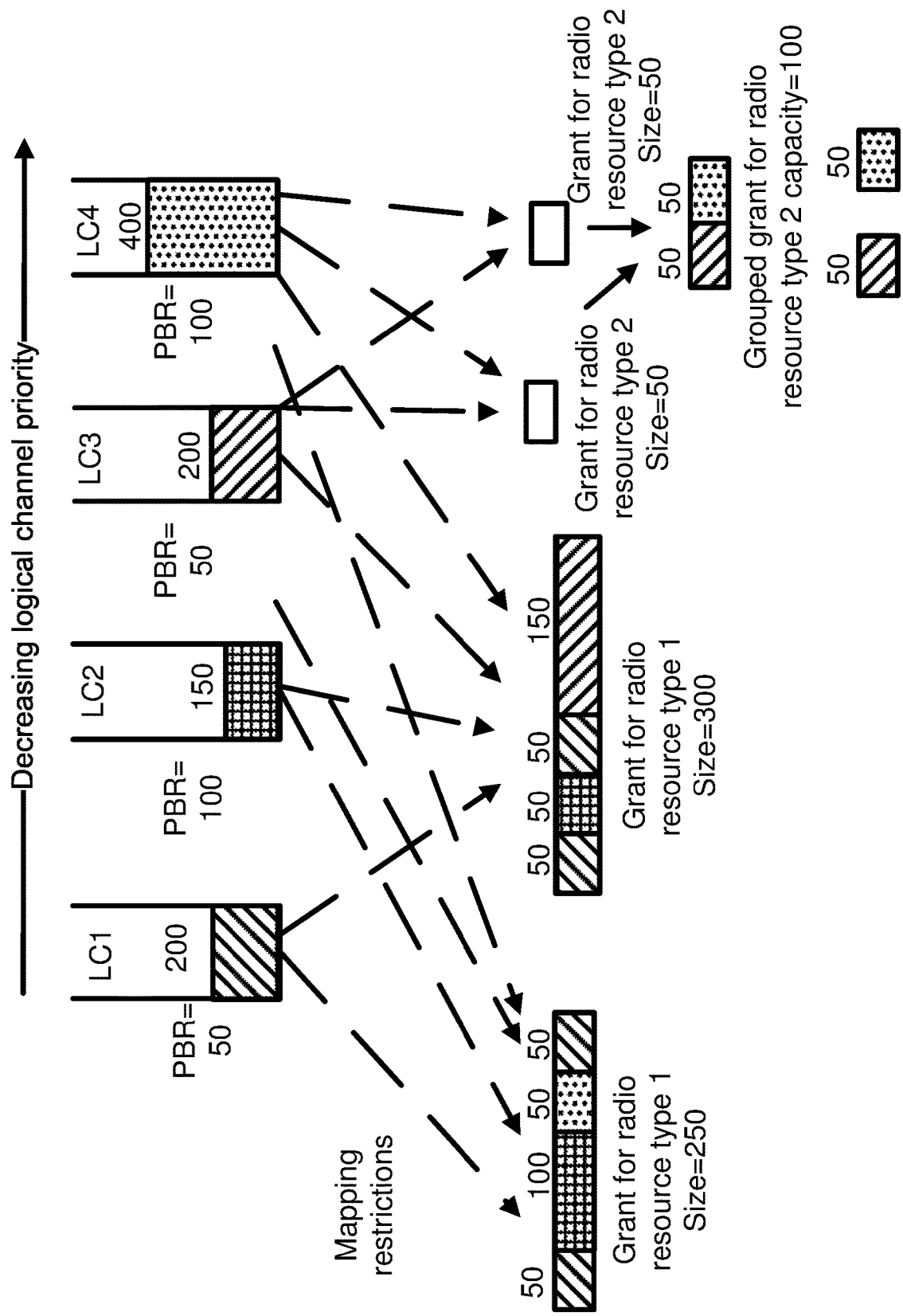
FIG. 13 is an illustration of an example of logical channel prioritization as per an aspect of an embodiment of the present disclosure.

In an example, the MAC entity may consider the grouped grants for the second radio resource type (e.g., LAA SCells) (with sum capacity equal to sum of capacities of grants for the second radio resource type) and the grants for the first radio resource type (e.g., licensed cells), one at a time, when serving the logical channels (see e.g. FIG. 13).

In an example embodiment, for a grant for a first radio resource type (e.g., licensed cells), the logical channels with Bj>0 may be allocated resources in a decreasing priority order and a logical channel may be served up to its PBR. If the PBR of a logical channel is "infinity," the data of the logical channel that is available for transmission may be served. If a logical channel may only be transmitted on the first radio resource type (e.g., licensed cells), the resources from the grant for the first radio resource type may be allocated. If a logical channel may be transmitted on both first radio resource type (e.g., licensed cells) and the second radio resource type (e.g., LAA SCells) and there are at least as much resources in the grouped grants for the second radio resource type (e.g., LAA SCells) to achieve the PBR of the logical channel, the MAC entity may allocate resources from the grouped grants for the second radio resource type (e.g., LAA SCells). If there are not enough resources in the grouped grants on the second radio resource type (e.g., LAA SCells) to achieve the PBR of the logical channel, the MAC entity may allocate remaining resources from the grouped grants for the second radio resource type (e.g., LAA cells) and then allocate resources from the grant on the first radio resource type (e.g., licensed cell) to achieve resource allocation for the logical channel up to PBR. The MAC entity may decrement Bj of a logical channel by the total size of MAC SDUs served to logical channel j. If resources remain in the grouped grants for the second radio resource type (e.g., on LAA SCells) or the grant for the first radio resource type (e.g., on licensed cell), logical channels, regardless of the value of Bj, may be served in a decreasing priority order. If a logical channel may only be transmitted on licensed cells, the data in the logical channel may be served until either the data or the grant for the first radio resource type (e.g., on licensed cell) is exhausted, whichever comes first. If a logical channel may be transmitted on both the first radio resource type (e.g., licensed cells) and the second radio resource type (e.g., eLAA SCells), the data in the logical channel may be served until either the data is exhausted or the grant for the first radio resource type (e.g., on licensed cell) and the grouped grants for the second radio resource type (e.g., on LAA SCells) is exhausted, whichever comes first. In an example, the data in the logical channel may be served starting with grouped grants for the second radio resource (e.g., on LAA cells) and then the grant for the first radio resource type (on licensed cell).

An example of logical channel prioritization is depicted in FIG. 13. In the example of FIG. 13, it may be assumed that Bj of logical channels is positive at the start of logical channel prioritization procedure and remain positive after the resource allocations. In the example of FIG. 13, the MAC entity may start from the grant in licensed cell 1 (LC1). In an example, the MAC entity may start from an arbitrary grant on licensed cells. In an example, the radio resource type 1 may be a licensed cell type. In an example, the radio resource type 2 may be an unlicensed cell type. Other example radio resource types may be provided.

In an example embodiment, the MAC entity may perform a Logical Channel Prioritization procedure when a new transmission is performed. The MAC entity may allocate resources to the logical channels as follows: The MAC entity may consider both the grouped grants on the second radio resource type (e.g., LAA SCells) (with capacity equal to the sum of the capacity of grants for the second radio resource type, e.g., on LAA SCells) and the grants for the first radio resource type (e.g., on licensed cells). For a grant for the first radio resource type (e.g., on licensed cells), the logical channels with Bj>0 may be allocated resources in a decreasing priority order. The PBR of a logical channel that may be transmitted on both first radio resource type (e.g., licensed cells) and radio resource type 2 (e.g., LAA SCells) is first mapped to remaining resources (if any) on the grouped grants for the second radio resource type (e.g., on LAA SCells), and then mapped to remaining resources (if any) on the grant for the first radio resource type (e.g., on licensed cell). If the PBR of a logical channel is set to "infinity," the MAC entity may allocate resources for the data that is available for transmission on the logical channel before meeting the PBR of the lower priority logical channel(s). The MAC entity may decrement Bj by the total size of MAC SDUs served to logical channel j above. The value of Bj may be negative. If any resources remain on the grant for the first radio resource type (e.g., on licensed cell) or the grouped grant for the second radio resource type (e.g., on LAA SCells), the logical channels may be served in a strict decreasing priority order considering the logical channel mapping restriction (regardless of the value of Bj) until either the data for that logical channel or both of the grant for the first radio resource type (e.g., on licensed cell) and the grouped grants for the second radio resource type (e.g., on LAA SCells) are exhausted, whichever comes first. Logical channels configured with equal priority may be served equally.

A wireless device may receive at least one control packet indicating: at least one first grant in a subframe of one or more first radio resource type (e.g., licensed cells), and at least one second grant in the subframe of one or more second radio resource type (e.g., license-assisted-access (LAA) cells). The wireless device may calculate a first radio resource type (e.g., licensed) aggregate grant by summing the capacity of the at least one first grant. The wireless device may calculate a second radio resource type (e.g., LAA) aggregate grant by summing the capacity of the at least one first grant. The wireless device may allocate resources to logical channels on the first radio resource type (e.g., licensed) aggregate grant and the second radio resource type (e.g., LAA) aggregate grant, considering a logical channel mapping restriction. The logical channel mapping restriction may indicate whether a logical channel is prohibited from transmission on the second radio resource type (e.g., an LAA cell).

In an example Scheduling mechanism, a UE may receive grants for transmission on one or more firs radio resource type (e.g., licensed cell(s)) and one or more second radio type (e.g., LAA SCell(s)) in a TTI. In an example, eNB may signal the LBT priority class for the grant(s) on LAA SCells. In an example, the MAC entity may group the grants on LAA SCells with the same signaled LBT priority class. The MAC entity may follow the procedures described in one of the above examples (e.g., grouped or non-grouped grants on licensed cells) and may allocate resources to a logical channel that may be transmitted on both licensed cells and LAA SCells from the corresponding individual or grouped grants (e.g., the individual or grouped grants whose LBT priority class corresponds to the logical channel priority).

In an example scheduling mechanism, a UE may receive grants for transmission on one or more first radio resource type (e.g., licensed cell(s)) and one or more second radio resource type (e.g., LAA SCell(s)) in a TTI. In an example, a UE may determine LBT priority class for the grant(s) on LAA SCells, e.g. based on logical channel priority of data transmitted in a grant/TB.

In an example, the MAC entity may consider first the grouped grants for the second radio resource type (e.g., on LAA SCells) (with capacity equal to sum of capacities of grants for the second radio resource type) and then the grouped grants on the first radio resource type (e.g., licensed cells) (with capacity equal to the sum of the capacity of grants for the first radio resource type) when serving the logical channels (See e.g., FIG. 12).

In an example, the resources on the grouped grants for the second radio resource type (e.g., on LAA SCells) may be allocated to the logical channels with Bj>0 that may be transmitted on both first radio resource type (e.g., licensed cells) and second radio resource type (e.g., LAA SCells) in a decreasing priority order and a logical channel may be served up to its PBR. In an example, if the PBR of a logical channel is "infinity," the data of the logical channel that is available for transmission may be served. The MAC entity may decrement Bj of a logical channel by the total size of MAC SDUs served to logical channel j in the first action. If resources remain in the grouped grants for the second radio resource type (e.g., on LAA SCells), the logical channels that may be transmitted on both first radio resource type (e.g., licensed cells) and second radio resource type (e.g., LAA SCells) may be served in a strict decreasing priority order (regardless of the value of Bj) until either the data for that logical channel or the grouped grants on LAA SCells is exhausted, whichever comes first. Logical channels configured with equal priority may be served equally.

In an example, the resources on the grouped grants for the first radio resource type (e.g., on licensed cells) may be allocated to the logical channels with Bj>0 that may only be transmitted on the first radio resource type (e.g., licensed cells) in a decreasing priority order and a logical channel may be served up to its PBR. If the PBR of a logical channel is "infinity," of the data of the logical channel that is available for transmission may be served. If there is(are) logical channel(s) with Bj>0 that may be transmitted on both first radio resource type (e.g., licensed cells) and the second radio resource type (e.g., LAA SCells) and have not received enough resources to achieve its (their) PBR, the MAC entity may allocate resources from the grouped grants for the first radio resource type (e.g., on licensed cells) to such logical channel(s) up to its (their) PBR in a decreasing logical channel priority order. The MAC entity may decrement Bj of a logical channel by the total size of MAC SDUs served to logical channel j in the above action. If resources remain in the grouped grants for the first radio resource type (e.g., on licensed cells), the logical channels may be served in a strict decreasing priority order (regardless of the value of Bj) until either the data for that logical channel or the grouped grants for the first radio resource type (e.g. on licensed cells) is exhausted, whichever comes first. Logical channels configured with equal priority may be served equally.

An example of logical channel prioritization is depicted in FIG. 12. In the example of FIG. 12, it may be assumed that Bj of logical channels is positive at the start of logical channel prioritization procedure and remain positive after the resource allocations. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example implementation, the MAC entity may allocate resources to the logical channels as follows. The MAC entity may apply the actions 1-3 below for logical channels that may be transmitted on both a first radio resource type (e.g., licensed cells) and a second radio resource type (e.g., unlicensed/LAA SCells) to the grouped grants for the second radio resource type (e.g., on LAA SCells) (with capacity equal to the sum of the capacity of grants for the second radio resource type). The MAC entity may apply the actions 1-2 below for logical channels that may only be transmitted on the first radio resource type (e.g., licensed cells) to the grouped grants for the first radio resource type (e.g., on licensed cells) (with capacity equal to the sum of the capacity of grants for the first radio resource type (e.g., on licensed cells)). In an example, if there is(are) logical channel(s) that may be transmitted on both the first and the second radio resource type (e.g., licensed and unlicensed cells) and has(have) not achieved its PBR, apply and action 1-2 below for such logical channel(s) to the grouped grants for the first radio resource type (e.g. on licensed cells). The MAC entity may apply action 3 below for logical channels to the grouped grants on licensed cells.

For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, a UE may receive grants for transmission on one or more licensed cell(s) and one or more LAA SCell(s) in a TTI. In an example, a UE may determine LBT priority class for the grant(s) on LAA SCells, e.g., based on logical channel priority of data included in a grant/TB.

Figure 14:
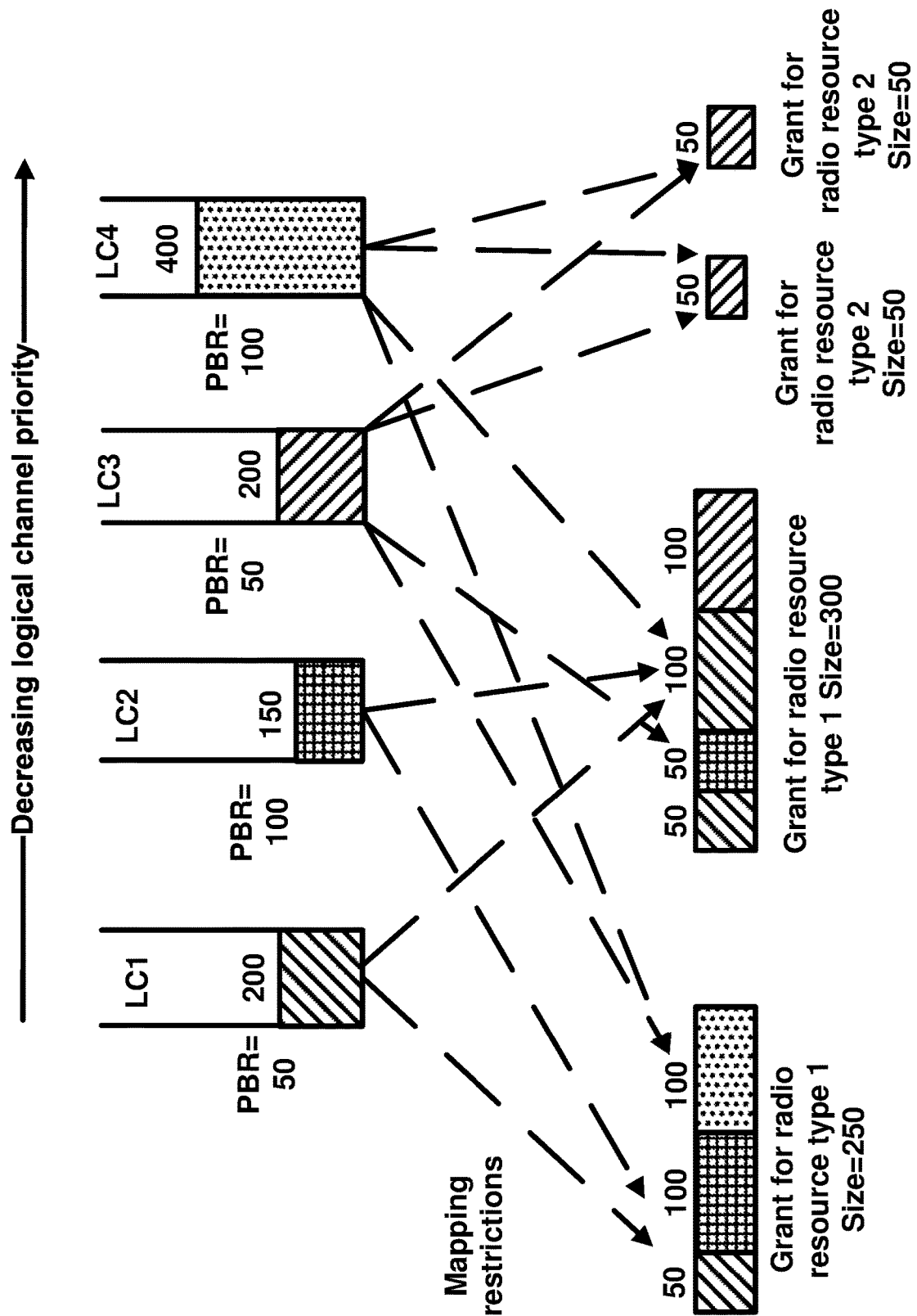
FIG. 14 is an illustration of an example of logical channel prioritization as per an aspect of an embodiment of the present disclosure.

In an example, the MAC entity may consider first the grants for the second radio resource type (e.g., on LAA SCells) and next the grants for the first radio resource type (e.g., on licensed cells) when serving the logical channels (See e.g., FIG. 14).

In an example embodiment, for a grant for the second radio resource type (e.g., on LAA SCells). The resources of the grant may be allocated to the logical channels with Bj>0 that may be transmitted on both the first radio resource type and the second radio resource type (e.g., licensed cells and LAA SCells) in a decreasing priority order and a logical channel may be served up to its PBR. In an example, if the PBR of a logical channel is "infinity," the data of the logical channel that is available for transmission may be served. The MAC entity may decrement Bj of a logical channel by the total size of MAC SDUs served to logical channel j in the first action. If resources remain in the grant, the logical channels that may be transmitted on both the first radio resource type and the second radio resource type (e.g., licensed cells and LAA SCells) may be served in a strict decreasing priority order (regardless of the value of Bj) until either the data for that logical channel or the grant is exhausted, whichever comes first. Logical channels configured with equal priority may be served equally.

In an example, for a grant for the first radio resource type (e.g., on licensed cells), the resources of the grant may be allocated to the logical channels with Bj>0 that may only be transmitted on the first radio resource type (e.g., on licensed cells) in a decreasing priority order and a logical channel may be served up to its PBR. If the PBR of a logical channel is "infinity," the data of the logical channel that is available for transmission may be served. If there is(are) logical channel(s) with Bj>0 that may be transmitted on both the first radio resource type and the second radio resource type (e.g., licensed cells and LAA SCells) and have not received enough resources to achieve its (their) PBR, the MAC entity may allocate resources from the grant to such logical channel(s) in a decreasing logical channel priority order up to its (their) PBR. The MAC entity may decrement Bj of a logical channel by the total size of MAC SDUs served to logical channel j in the fifth action. If resources remain in the grant, the logical channels may be served in a strict decreasing priority order (regardless of the value of Bj) until either the data for that logical channel or the grant is exhausted, whichever comes first. Logical channels configured with equal priority may be served equally.

An example of logical channel prioritization is depicted in FIG. 14. In the example of FIG. 14, it may be assumed that Bj of logical channels is positive at the start of logical channel prioritization procedure and remain positive after the resource allocations. In the example of FIG. 14, the MAC entity may serve the logical channels in following sequence: grant in LAA SCell 1, grant in LAA SCell 2, grant in licensed cell 1 (LC1) and grant in licensed cell 2 (LC2). In an example, the order of allocating grants in LAA SCell and/or the order of allocating grants in licensed cells may be arbitrary. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. The MAC entity may allocate resources to the logical channels as follows. The MAC entity may apply the actions 1-3 below for logical channels that may be transmitted on both a first radio resource type and a second radio resource type (e.g., on licensed cells and LAA SCells) to the grants for the second radio resource type (e.g., on LAA SCells). In an example, for a grant for a first radio resource type (e.g., on licensed cells), the MAC entity may apply the actions 1-2 below for logical channels that may only be transmitted on the first radio resource type (e.g., licensed cells) to the grant. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grant. The MAC entity may apply action 3 below for logical channels to the grant.

For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, a UE may receive grants for transmission on one or more first radio resource type (e.g., licensed cell(s)) and one or more second radio resource type (e.g., LAA SCell(s)) in a TTI. In an example, the UE may determine an LBT priority class for the grant(s) on LAA SCells, e.g., based on logical channel priority of the data included in a grant/TB.

In an example, the MAC entity may first consider the grouped grants for the second radio resource type (e.g., on LAA SCells) (with capacity equal to sum of capacities of grants for the second radio resource type). The MAC entity may next consider the grants on licensed when serving the logical channels (See e.g., FIG. 13).

In an example embodiment, the resources of the grouped grants for the second radio resource type (e.g., on LAA SCells) may be allocated to the logical channels with Bj>0 that may be transmitted on both the first radio resource type and the second radio resource type (e.g., on licensed cells and LAA SCells) in a decreasing priority order and a logical channel may be served up to its PBR. If the PBR of a logical channel is "infinity," the data of the logical channel that is available for transmission may be served. The MAC entity may decrement Bj of a logical channel by the total size of MAC SDUs served to logical channel j in the first action. If resources remain in the grouped grant for the second radio resource type (e.g., on LAA SCells), the logical channels that may be transmitted on both licensed cells and LAA SCells may be served in a strict decreasing priority order (regardless of the value of Bj) until either the data for that logical channel or the grouped grant is exhausted, whichever comes first. Logical channels configured with equal priority may be served equally.

For a grant for the first radio resource type (e.g., on licensed cells), the resources of the grant may be allocated to the logical channels with Bj>0 that may only be transmitted on the first radio resource type (e.g., on licensed cells) in a decreasing priority order and a logical channel may be served up to its PBR. If the PBR of a logical channel is "infinity," the data of the logical channel that is available for transmission may be served. If there is(are) logical channel(s) with Bj>0 that may be transmitted on both the first radio resource type and the second radio resource type (e.g., licensed cells and LAA SCells) and have not received enough resources to achieve its (their) PBR, the MAC entity may allocate resources from the grant to such logical channel(s) in a decreasing logical channel priority order up to its (their) PBR. The MAC entity may decrement Bj of a logical channel by the total size of MAC SDUs served to logical channel j in the fifth action. If resources remain in the grant, logical channels may be served in a strict decreasing priority order (regardless of the value of Bj) until either the data for that logical channel or the grant is exhausted, whichever comes first. Logical channels configured with equal priority may be served equally.

An example of logical channel prioritization is depicted in FIG. 13. In the example of FIG. 13, it may be assumed that Bj of logical channels is positive at the start of logical channel prioritization procedure and remain positive after the resource allocations. In the example in FIG. 13, the MAC entity may serve the logical channels in following sequence: grouped grants in LAA SCells, grant in licensed cell 1 (LC1) and grant in licensed cell 2 (LC2). In an example, the order of allocating grants in licensed cells may be arbitrary. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example, the MAC entity may allocate resources to the logical channels as follows. The MAC entity may apply the actions 1-3 below for logical channels that may be transmitted on both licensed cells and LAA SCells to the grouped grants on LAA SCells.

For a grant on a first radio resource type (e.g., on licensed cells), the MAC entity may apply the actions 1-2 below for logical channels that may only be transmitted on the first radio resource type (e.g., licensed cells) to the grant. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grant. The MAC entity may apply action 3 below for logical channels to the grant.

For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, a UE may receive grants for transmission on one or more first radio resource type (e.g., licensed cell(s)) and one or more second radio resource type (e.g., LAA SCell(s)) in a TTI. In an example, a UE may determine an LBT priority class for the grant(s) of the first radio resource type (e.g., on LAA SCells), e.g., based on logical channels associated with data in a grant/TB.

Figure 15:
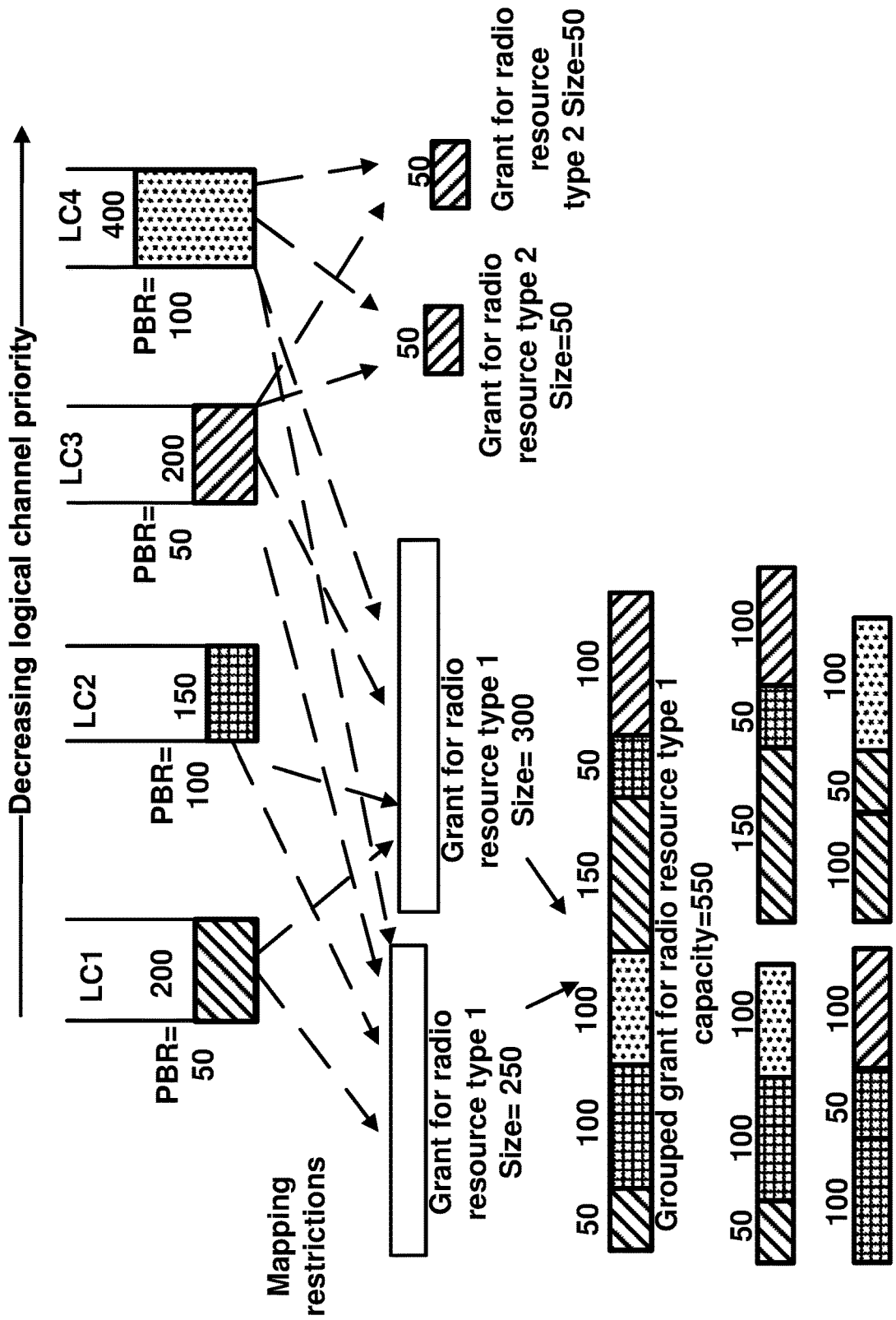
FIG. 15 is an illustration of an example of logical channel prioritization as per an aspect of an embodiment of the present disclosure.

In an example, the MAC entity may consider first the grants for the second radio resource type (e.g., on LAA SCells) and next the grouped grants for the first radio resource type (e.g., on licensed cells) when serving the logical channels (See e.g., FIG. 15).

In an example, for a grant on LAA SCells, the resources of the grant may be allocated to the logical channels with Bj>0 that may be transmitted on both the first radio resource type and the second radio resource type (e.g., licensed cells and LAA SCells) in a decreasing priority order and a logical channel may be served up to its PBR. If the PBR of a logical channel is "infinity," the data of the logical channel that is available for transmission may be served. In an example, the MAC entity may decrement Bj of a logical channel by the total size of MAC SDUs served to logical channel j in the first action. If resources remain in the grant, the logical channels that may be transmitted on both the first radio resource type and the second radio resource type (e.g., licensed cells and LAA SCells) may be served in a strict decreasing priority order (regardless of the value of Bj) until either the data for that logical channel or the grant is exhausted, whichever comes first. Logical channels configured with equal priority may be served equally.

In an example, for the grouped grants for the first radio resource type (e.g., on licensed cells), the resources on the grouped grants for the first radio resource type (e.g., on licensed cells) may be allocated to the logical channels with Bj>0 that may only be transmitted on the first radio resource type (e.g., licensed cells) in a decreasing priority order and a logical channel may be served up to its PBR. If the PBR of a logical channel is "infinity," the data of the logical channel that is available for transmission may be served. If there is(are) logical channel(s) with Bj>0 that may be transmitted on both licensed cells and LAA SCells and have not received enough resources to achieve its (their) PBR, the MAC entity may allocate resources from the grouped grants on licensed cells to such logical channel(s) up to its (their) PBR in a decreasing logical channel priority order. The MAC entity may decrement Bj of a logical channel by the total size of MAC SDUs served to logical channel j in the fifth action. If resources remain in the grouped grants for the first radio resource type (e.g., on licensed cells), the logical channels may be served in a strict decreasing priority order (regardless of the value of Bj) until either the data for that logical channel or the grouped grants on licensed cells is exhausted, whichever comes first. Logical channels configured with equal priority may be served equally.

An example of logical channel prioritization is depicted in FIG. 15. In the example of FIG. 15, it may be assumed that Bj of logical channels is positive at the start of logical channel prioritization procedure and remain positive after the resource allocations. In the example of FIG. 15, the MAC entity may serve the logical channels in following sequence: grant in LAA SCell1, grant in LAA SCell 2, and grouped grants in licensed cells. In an example, the order of allocating grants in LAA SCells may be arbitrary. In an example, the order of allocating grants in licensed cells may be arbitrary. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example, the MAC entity may allocate resources to the logical channels as follows. The MAC entity may apply the actions 1-3 below for logical channels that may be transmitted on both a first radio resource type and a second radio resource type (e.g., licensed cells and LAA SCells) to the grants on LAA SCells. For the grouped grants for the first radio resource type (e.g., on licensed cells) (with capacity equal to sum of the capacities of grants for the first radio resource type), the MAC entity may apply the actions 1-2 below for logical channels that may only be transmitted on the first radio resource type (e.g., licensed cells) to the grouped grants. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grouped grants. The MAC entity may apply action 3 below for logical channels to the grouped grants.

For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, a UE may receive grants for transmission on one or more first radio resource type (e.g., licensed cell(s)) and one or more radio resource type (e.g., LAA SCell(s)) in a TTI. In an example, eNB may signal the LBT priority class for the grant(s) on LAA SCells.

In an example, the MAC entity may group the grants on LAA SCells with the same signaled LBT priority class. The MAC entity may follow the procedures described in the previous examples and may first allocate the resources from the grants on LAA SCells. To allocate resources of an individual or grouped grant with an LBT priority class, the MAC entity may allocate resources of the individual or grouped grant to logical channel(s) that correspond to the LBT priority class of the individual or grouped grant. Once the data in logical channel(s) that correspond to the LBT priority class of the individual or grouped grant is exhausted, the MAC entity may allocate the resources to logical channel(s) that correspond to the higher order LBT priority class. In an example, the MAC entity may allocate resources of the individual or grouped grant to logical channel(s) that correspond to the LBT priority class of the individual or grouped grant or the logical channel channel(s) that correspond to the LBT priority classes higher than the LBT priority class of the individual or grouped grant (e.g., with stricter LBT requirements) of the individual or grouped grant.

In an example scheduling mechanism, a UE may receive grants for transmission on one or more first radio resource type (e.g., licensed cell(s)) and one or more second radio resource type (e.g., LAA SCell(s)) in a TTI.

In an example, the MAC entity may perform the following procedure for a grant for a first radio resource type (e.g., on LAA SCells). The resources of the grant may be allocated to the logical channels with $Bj>0$ that may be transmitted on both a first radio resource type and a second radio resource type (e.g., licensed cells and LAA SCells) in a decreasing priority order and logical channel may be served up to its PBR. If the PBR of a logical channel is "infinity," the data of the logical channel that is available for transmission may be served. The MAC entity may decrement Bj of a logical channel by the total size of MAC SDUs served to logical channel j. If resources remain, the logical channels that may be transmitted on both a first radio resource type and a second radio resource type (e.g., licensed cells and LAA SCells) may be served in a strict decreasing priority order (regardless of the value of Bj) until either the data for that logical channel or the grant is exhausted, whichever comes first. Logical channels configured with equal priority may be served equally.

The MAC entity may calculate the amount of resources allocated to the logical channels that may be transmitted on both the first radio resource type and the second radio resource type (e.g., licensed cells and LAA SCells) in excess of the sum of the PBRs of such logical channels. This amount may be negative if one or more of logical channels that may be transmitted on both licensed cells and LAA SCells are not allocated resources to achieve its (their) PBR.

In an example scheduling mechanism, Bj may be a bucket parameter calculated over a plurality of subframes as described above. S1 and S2 are parameters that indicate a parameter related to an amount of resources allocated logical channels of a category in a given subframe.

The MAC entity may perform the following procedure for a grant for a first radio resource type (e.g., on licensed cells). The resources of the grant may be allocated to the logical channels with $Bj>0$ in a decreasing priority order and a logical channel may be served up to its PBR. If the PBR of a logical channel is "infinity," the data of the logical channel that is available for transmission may be served.

In an example, if there is(are) logical channel(s) with $Bj>0$ that may be transmitted on both a first radio resource type and a second radio resource type (e.g., licensed cells and LAA SCells) and has(have) not received resources to achieve its (their) PBR, the MAC entity may allocate resources from the grant for the first radio resource type (e.g., on licensed cell) to such logical channel(s) up to its (their) PBR in a decreasing logical channel priority order. The MAC entity may decrement Bj of a logical channel by the total size of MAC SDUs served to logical channel j. In an example, if resources remain, the logical channels may be served in a strict decreasing priority order (regardless of the value of Bj) until either the data for that logical channel or the grant is exhausted, whichever comes first. Logical channels configured with equal priority may be served equally. When allocating resources to a logical channel that may be transmitted on both the first radio resource type and the second radio resource type (e.g., licensed cells and LAA SCells), the MAC entity may compare the amount of resources allocated in excess of the sum of PBRs of logical channels that may be only transmitted on the first radio resource type (e.g., licensed cells) (e.g., denote it as S2) and the amount of resources allocated in excess of the sum of PBRs of logical channels that may be transmitted on both the first radio resource type and the second radio resource type (e.g., licensed cells and LAA SCells) (e.g., denote it as S1). The MAC entity may serve the logical channel if S1<S2 or the data in logical channel(s) that may only be transmitted on the first radio resource type (e.g., licensed cells) is exhausted.

Figure 16:
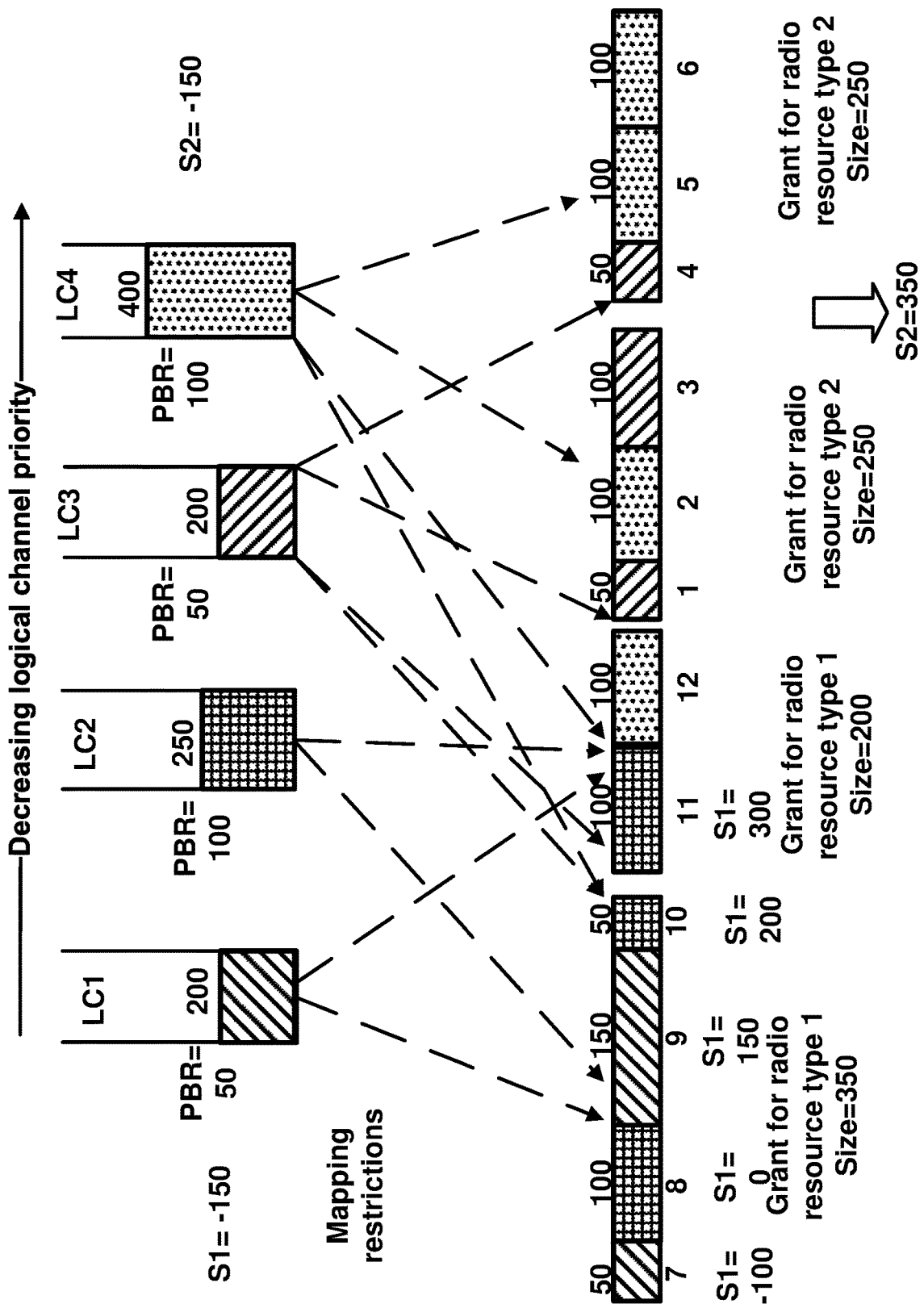
FIG. 16 is an illustration of an example of logical channel prioritization as per an aspect of an embodiment of the present disclosure.

An example of logical channel prioritization is depicted in FIG. 16. In the example of FIG. 16, it may be assumed that Bj of logical channels is positive at the start of logical channel prioritization procedure and remain positive after the resource allocations. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example, the MAC entity may set $S1=-\Sigma_{j\in L}PBR_j$ and $S2=-\Sigma_{j\in B}PBR_j$ where L is the set of logical channels that may be transmitted only on a first radio resource type (e.g., licensed cells), B is the set of logical channels that may be sent on both the first radio resource type (e.g., licensed cells) and a second radio resource type (e.g., LAA SCells) and $PBR_j$ is the priortized bit rate for logical channel j.

In an example, the MAC entity may allocate resources to the logical channels as follows. The MAC entity may apply the actions 1-3 below for logical channels that may be transmitted on both the first radio resource type and the second radio resource type (e.g., licensed cells and LAA SCells) to the grant(s) for the second radio resource type (e.g. on LAA SCells). The MAC entity may update S1 as follows: S1=S1+total size of resources allocated to logical channels that may be sent on both first radio resource type (e.g., licensed cells) and second radio resource type (e.g., LAA SCells).

For a grant for the first radio resource type (e.g., on licensed cells), the MAC entity may apply the actions 1-2 below for the logical channels that may be transmitted on both the first radio resource type and the second radio resource type (e.g., licensed cells and LAA SCells) to the grant. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grant. The MAC entity may update S1 or S2 as follows: S1=S1+total size of resources allocated to logical channels that may be transmitted on both the first radio resource type and the second radio resource type (e.g., licensed cells and LAA SCells), and S2=S2+total size of resources allocated to logical channels that may only be transmitted on the first radio resource type (e.g., licensed cells).

The MAC entity may apply action 3 below to logical channels. If data of a logical channel may be transmitted on both the first radio resource type and the second radio resource type (e.g., licensed cells and LAA SCells), S1>S2 and data in logical channels that may be transmitted only on the first radio resource type (e.g. licensed cells) is not exhausted, skip the logical channel For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, the UE may receive grants for transmission on one or more licensed cell(s) and one or more LAA SCell(s) in a TTI. In an example, a UE may determine the LBT priority class for the grant(s) on LAA SCells.

In an example, the MAC entity may perform the following procedure for the grouped grants for the second radio resource type (e.g., on LAA SCells) (with capacity equal to the sum of the capacity of grants for the second radio resource type). The resources of the grouped grants may be allocated to the logical channels with Bj>0 that may be transmitted on both the first radio resource type and the second radio resource type (e.g., licensed cells and LAA SCells) in a decreasing priority order and a logical channel may be served up to its PBR. If the PBR of a logical channel is "infinity," the data of the logical channel that is available for transmission may be served. The MAC entity may decrement Bj of a logical channel by the total size of MAC SDUs served to logical channel j. In an example, if resources remain, the logical channels that may be transmitted on both the first radio resource type and the second radio resource type (e.g., licensed cells and LAA SCells) may be served in a strict decreasing priority order (regardless of the value of Bj) until either the data for that logical channel or the grouped grants is exhausted, whichever comes first. Logical channels configured with equal priority may be served equally.

The MAC entity may calculate the amount of resources allocated to the logical channels that may be transmitted on both the first radio resource type and the second radio resource type (e.g., licensed cells and LAA SCells) in excess of the sum of the PBRs of such logical channels. This amount may be negative if one or more of logical channels that may be transmitted on both the first radio resource type and the second radio resource type (e.g., licensed cells and LAA SCells) are not allocated resources to achieve its (their) PBR.

In an example, the MAC entity may perform the following procedure for a grant for a first radio resource type (e.g., on licensed cells). The resources of the grant may be allocated to the logical channels with Bj>0 in a decreasing priority order and a logical channel may be served up to its PBR. If the PBR of a logical channel is "infinity," the data of the logical channel that is available for transmission may be served. In an example, if there is(are) logical channel(s) with Bj>0 that may be transmitted on both the first radio resource type and the second radio resource type (e.g., licensed cells and LAA SCells) and has(have) not received resources to achieve its(their) PBR, the MAC entity may allocate resources from the grant for the first radio resource type (e.g., on licensed cell) to such logical channel(s) up to its(their) PBR in a decreasing logical channel priority order. The MAC entity may decrement Bj of a logical channel by the total size of MAC SDUs served to logical channel j. In an example, if resources remain, the logical channels may be served in a strict decreasing priority order (regardless of the value of Bj) until either the data for that logical channel or the grant is exhausted, whichever comes first. Logical channels configured with equal priority may be served equally. When allocating resources to a logical channel that may be transmitted on both the first radio resource type 1 and the radio resource type 2 (e.g., licensed cells and LAA SCells), the MAC entity may compare the amount of resources allocated in excess of the sum of PBRs of logical channels that may be only transmitted on the first radio resource type (e.g., licensed cells) (e.g., denote it as S2) and the amount of resources allocated in excess of the sum of PBRs of logical channels that may be transmitted on both the first radio resource type and the second radio resource type (e.g., licensed cells and LAA SCells) (e.g., denote it as S1). The MAC entity may serve the logical channel if S1<S2 or the data in logical channel(s) that may only be transmitted on the first radio resource type (e.g., licensed cells) is exhausted.

Figure 17:
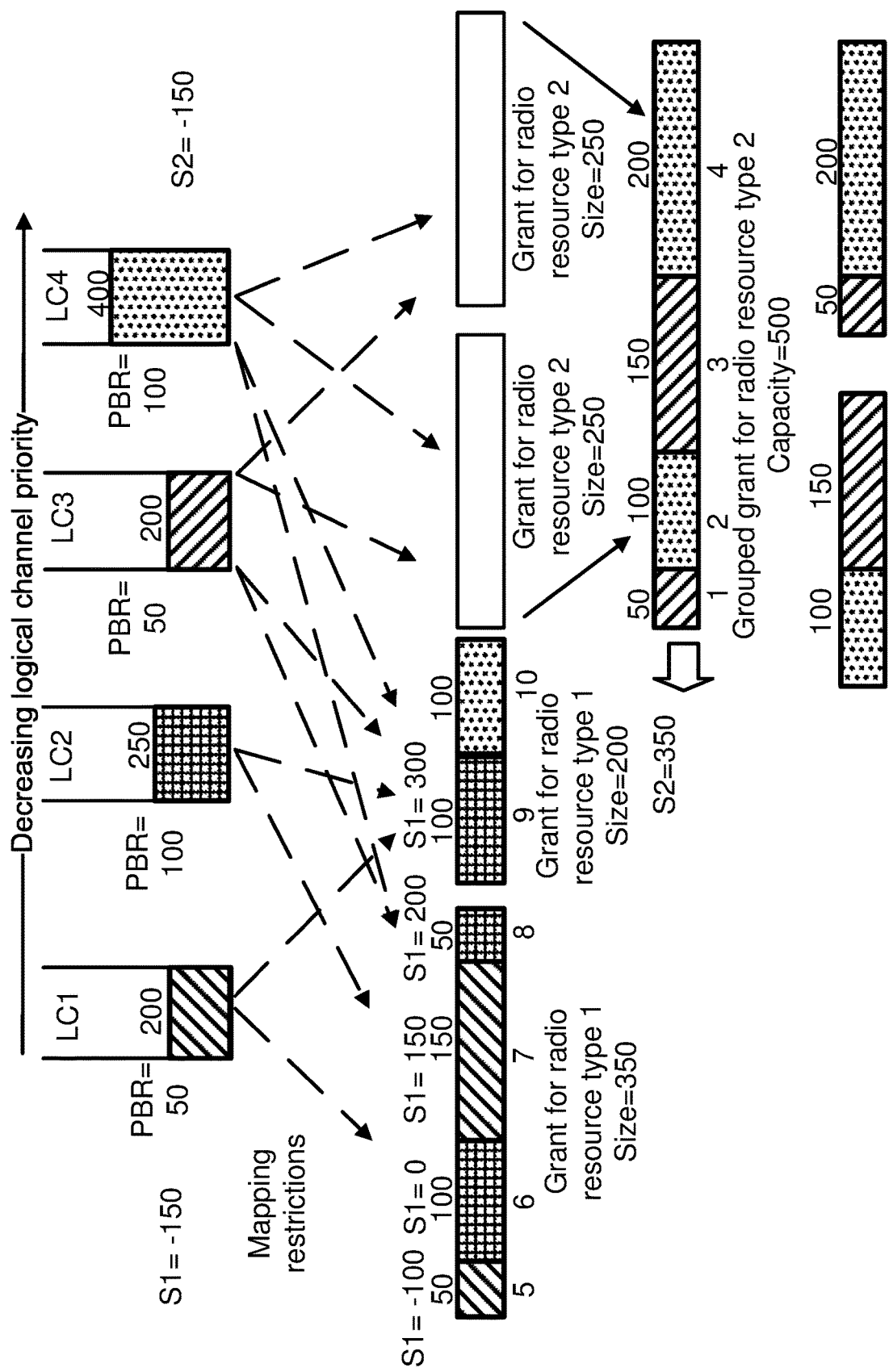
FIG. 17 is an illustration of an example of logical channel prioritization as per an aspect of an embodiment of the present disclosure.

An example of logical channel prioritization is depicted in FIG. 17. In the example of FIG. 17, it may be assumed that Bj of logical channels is positive at the start of logical channel prioritization procedure and remain positive after the resource allocations. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example, the MAC entity may set $S1=-\Sigma_{j\in L}PBR_j$ and $S2=-\Sigma_{j\in B}PBR_j$, where L is the set of logical channels that may be transmitted only on a first radio resource type (e.g., licensed cells), B is the set of logical channels that may be sent on both the first radio resource type and a second radio resource type (e.g., licensed cells and LAA SCells0 and PBR is the priortized bit rate for logical channel j.

In an example, the MAC entity may allocate resources to the logical channels as follows. The MAC entity may apply the actions 1-3 below for logical channels that may be transmitted on both the first radio resource type and the second radio resource type (e.g., licensed cells and LAA SCells) to the grouped grant(s) for the second radio resource type (e.g., on LAA SCells) (with capacity equal to the sum of the capacity of grants for the second radio resource type). The MAC entity may update S1 as follows: S1=S1+total size of resources allocated to logical channels that may be transmitted on both the first radio resource type and the second radio resource type (e.g., licensed cells and LAA SCells).

For a grant for a first radio resource type (e.g., on licensed cells), the MAC entity may apply the actions 1-2 below for the logical channels that may be transmitted on both the first radio resource type and the second radio resource type (e.g., licensed cells and LAA SCells) to the grant. In an example, if there is(are) logical channel(s) that may be transmitted on both the first radio resource type and the second radio resource type (e.g., licensed and unlicensed cells) and has (have) not achieved its PBR, apply and action 1-2 below for such logical channel(s) to the grant. The MAC entity may update S1 or S2 as follows: S1=S1+total size of resources allocated to logical channels that may be transmitted on both the first radio resource type and the second radio resource type (e.g., licensed cells and LAA SCells), and S2=S2+total size of resources allocated to logical channels that may only be transmitted on the first radio resource type (e.g., licensed cells).

In an example, the MAC entity may apply action 3 below to logical channels. If a logical channel may be transmitted on both the first radio resource type and the second radio resource type (e.g., licensed cells and LAA SCells), S1>S2 and data in logical channels that may be transmitted only on the first radio resource type (e.g., licensed cells) is not exhausted, the MAC entity may skip the logical channel For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, the UE may receive grants for transmission on one or more licensed cell(s) and one or more LAA SCell(s) in a TTI. In an example, a UE may determine the LBT priority class for the grant(s) on LAA SCells.

In an example, the MAC entity may perform the following procedure for a grant on LAA SCells. The resources of the grant may be allocated to the logical channels with Bj>0 that may be transmitted on both a first radio resource type and a second radio resource type (e.g., licensed cells and LAA SCells) in a decreasing priority order and a logical channel may be served up to its PBR. If the PBR of a logical channel is "infinity," the data of the logical channel that is available for transmission may be served. The MAC entity may decrement Bj of a logical channel by the total size of MAC SDUs served to logical channel j. In an example, if resources remain, the logical channels that may be transmitted on both the first radio resource type and a second radio resource type (e.g., licensed cells and LAA SCells) may be served in a strict decreasing priority order (regardless of the value of Bj) until either the data for that logical channel or the grant is exhausted, whichever comes first. Logical channels configured with equal priority may be served equally. The MAC entity may calculate the amount of resources allocated to the logical channels that may be transmitted on both the first radio resource type and the second radio resource type (e.g., licensed cells and LAA SCells) in excess of the sum of the PBRs of such logical channels. This amount may be negative if one or more of logical channels that may be transmitted on both the first radio resource type and the second radio resource type (e.g., licensed cells and LAA SCells) are not allocated resources to achieve its (their) PBR.

In an example, the MAC entity may perform the following procedure for the grouped grant for a first radio resource type (e.g., on licensed cells). The resources of the grouped grants may be allocated to the logical channels with Bj>0 in a decreasing priority order and a logical channel may be served up to its PBR. If the PBR of a logical channel is "infinity," the data of the logical channel that is available for transmission may be served. In an example, if there is(are) logical channel(s) with Bj>0 that may be transmitted on both the first radio resource type and the second radio resource type (e.g., licensed cells and LAA SCells) and has(have) not received resources to achieve its(their) PBR, the MAC entity may allocate resources from the grouped grants on licensed cell to such logical channel(s) up to its(their) PBR in a decreasing logical channel priority order. The MAC entity may decrement Bj of a logical channel by the total size of MAC SDUs served to logical channel j. In an example, if resources remain, the logical channels may be served in a strict decreasing priority order (regardless of the value of Bj) until either the data for that logical channel or the grant is exhausted, whichever comes first. Logical channels configured with equal priority may be served equally. Before allocating resources to a logical channel that may be transmitted on both the first radio resource type and the second radio resource type (e.g., licensed cells and LAA SCells), the MAC entity may compare the amount of resources allocated in excess of the sum of PBRs of logical channels that may be only transmitted on the first radio resource type (e.g., licensed cells) (e.g., denote it as S2) and the amount of resources allocated in excess of the sum of PBRs of logical channels that may be transmitted on both the first radio resource type and the second radio resource type (e.g., licensed cells and LAA SCells) (e.g., denote it as S1). The MAC entity may serve the logical channel if S1<S2 or the data in logical channel(s) that may only be transmitted on the first radio resource type (e.g., licensed cells) is exhausted.

Figure 18:
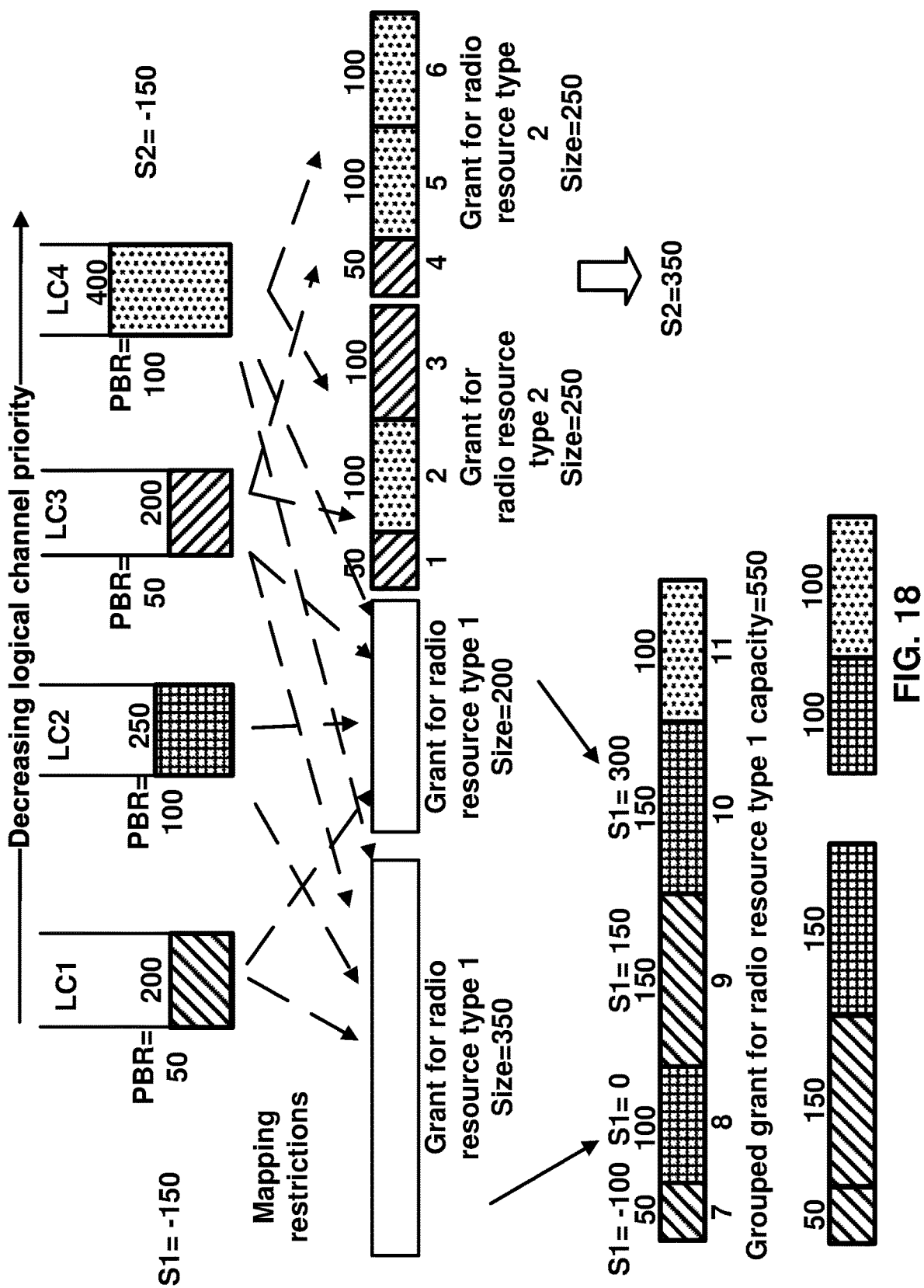
FIG. 18 is an illustration of an example of logical channel prioritization as per an aspect of an embodiment of the present disclosure.

An example of logical channel prioritization is depicted in FIG. 18. In the example of FIG. 18, it may be assumed that Bj of logical channels is positive at the start of logical channel prioritization procedure and remain positive after the resource allocations. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed. In an example, the MAC entity may set $S1=-\Sigma_{j\in L}PBR_j$ and $S2=-\Sigma_{j\in B}PBR_j$ where L is the set of logical channels that may be transmitted only on a first radio resource type (e.g., licensed cells), B is the set of logical channels that may be sent on both the first radio resource type and the second radio resource type (e.g. licensed cells and LAA SCells) and $PBR_j$ is the priortized bit rate for logical channel j. In an example, the MAC entity may allocate resources to the logical channels as follows: the MAC entity may apply the actions 1-3 below for logical channels that may be transmitted on both a first radio resource type and a second radio resource type (e.g., licensed cells and LAA SCells) to the grant(s) on LAA SCells.

In an example, the MAC entity may update S1 as follows: S1=S1+total size of resources allocated to logical channels that may be transmitted on both the first radio resource type and the second radio resource type (e.g., licensed cells and LAA SCells).

In an example, for the grouped grants for the first radio resource type (e.g., on licensed cells). The MAC entity may apply the actions 1-2 below for the logical channels that may be transmitted on both the first radio resource type and the second radio resource type (e.g., licensed cells and LAA SCells) to the grouped grants. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grouped grants. In an example, the MAC entity may update S1 or S2 as follows: S1=S1+total size of resources allocated to logical channels that may be transmitted on both the first radio resource type and the second radio resource type (e.g., licensed cells and LAA SCells), and S2=S2+total size of resources allocated to logical channels that may only be transmitted on the first radio resource type (e.g. licensed cells).

The MAC entity may apply action 3 below to logical channels. If a logical channel may be transmitted on both the first radio resource type and the second radio resource type (e.g., licensed cells and LAA SCells), S1>S2 and data in logical channels that may be transmitted only on the first radio resource type (e.g., licensed cells) is not exhausted, skip the logical channel For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, the UE may receive grants for transmission on one or more licensed cell(s) and one or more LAA SCell(s) in a TTI. In an example, a UE may determine the LBT priority class for the grant(s) on LAA SCells.

In an example embodiment, the MAC entity may perform the following procedure for the grouped grants on a second radio resource type (e.g., LAA SCells). The resources of the grouped grants may be allocated to the logical channels with Bj>0 that may be transmitted on both the first radio resource type and the second radio resource type (e.g., licensed cells and LAA SCells) in a decreasing priority order and a logical channel may be served up to its PBR. If the PBR of a logical channel is "infinity," the data of the logical channel that is available for transmission may be served. The MAC entity may decrement Bj of a logical channel by the total size of MAC SDUs served to logical channel j. If resources remain, the logical channels that may be transmitted on both the first radio resource type and the second radio resource type (e.g., licensed cells and LAA SCells) may be served in a strict decreasing priority order (regardless of the value of Bj) until either the data for that logical channel or the grouped grants is exhausted, whichever comes first. Logical channels configured with equal priority may be served equally. The MAC entity may calculate the amount of resources allocated to the logical channels that may be transmitted on both the first radio resource type and the second radio resource type (e.g., licensed cells and LAA SCells) in excess of the sum of the PBRs of such logical channels. This amount may be negative if one or more of logical channels that may be transmitted on both the first radio resource type and the second radio resource type (e.g., licensed cells and LAA SCells) are not allocated resources to achieve its(their) PBR.

In an example, the MAC entity may perform the following procedure for the grouped grant for a first radio resource type (e.g., licensed cells). The resources of the grouped grants may be allocated to the logical channels with Bj>0 in a decreasing priority order and a logical channel may be served up to its PBR. If the PBR of a logical channel is "infinity," of the data of the logical channel that is available for transmission may be served. If there is(are) logical channel(s) with Bj>0 that may be transmitted on both the first radio resource type and the second radio resource type (e.g., licensed cells and LAA SCells) and has(have) not received resources to achieve its(their) PBR, the MAC entity may allocate resources from the grouped grants for the first radio resource type (e.g., on licensed cell) to such logical channel(s) up to its(their) PBR in a decreasing logical channel priority order. The MAC entity may decrement Bj of a logical channel by the total size of MAC SDUs served to logical channel j. If resources remain, the logical channels may be served in a strict decreasing priority order (regardless of the value of Bj) until either the data for that logical channel or the grant is exhausted, whichever comes first. Logical channels configured with equal priority may be served equally. Before allocating resources to a logical channel that may be transmitted on both the first radio resource type and the second radio resource type (e.g., licensed cells and LAA SCells), the MAC entity may compare the amount of resources allocated in excess of the sum of PBRs of logical channels that may be only transmitted on the first radio resource type (e.g., licensed cells) (e.g., denote it as S2) and the amount of resources allocated in excess of the sum of PBRs of logical channels that may be transmitted on both the first radio resource type and the second radio resource type (e.g., licensed cells and LAA SCells) (e.g., denote it as S1). The MAC entity may serve the logical channel if S1<S2 or the data in logical channel(s) that may only be transmitted on the first radio resource type (e.g., licensed cells) is exhausted.

Figure 19:
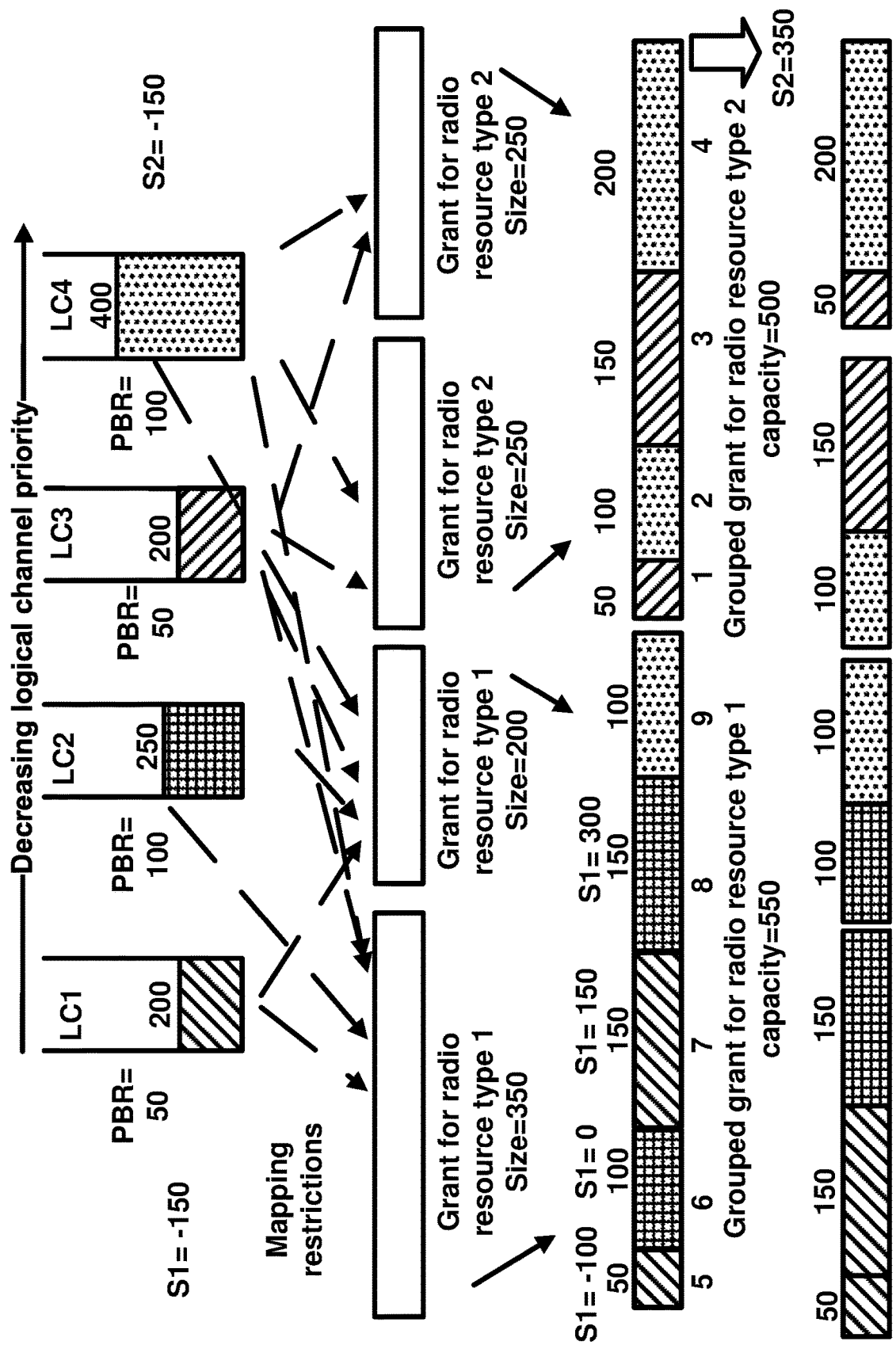
FIG. 19 is an example flow diagram as per an aspect of an embodiment of the present disclosure.

An example of logical channel prioritization is depicted in FIG. 19. In the example of FIG. 19, it may be assumed that Bj of logical channels is positive at the start of logical channel prioritization procedure and remain positive after the resource allocations. In an example, the radio resource type 1 may be a licensed cell type. In an example, the radio resource type 2 may be an unlicensed cell type. Other example radio resource types may be provided.

In an example, the MAC entity may perform a Logical Channel Prioritization procedure when a new transmission is performed.

In an example, the MAC entity may set $S1=-\Sigma_{j \in L} PBR_j$ and $S2=-\Sigma_{j \in B} PBR_j$ where L is the set of logical channels that may be transmitted only on the first radio resource type (e.g., licensed cells), B is the set of logical channels that may be sent on both the first radio resource type and the second radio resource type (e.g., licensed cells and LAA SCells) and $PBR_j$ is the prioritized bit rate for logical channel j. The MAC entity may allocate resources to the logical channels as follows. The MAC entity may apply the actions 1-3 below for logical channels that may be transmitted on both the first radio resource type and the second radio resource type (e.g., licensed cells and LAA SCells) to the grouped grant(s) for the second radio resource type (e.g., on LAA SCells). In an example, the MAC entity may update S1 as follows: S1=S1+ total size of resources allocated to logical channels that may be transmitted on both the first radio resource type and the second radio resource type (e.g., licensed cells and LAA SCells).

In an example, for the grouped grants on the first radio resource type (e.g., licensed cells), the MAC entity may apply the actions 1-2 below for the logical channels that may be transmitted on both the first radio resource type and the second radio resource type (e.g., licensed cells and LAA SCells) to the grouped grants. If there is(are) logical channel(s) that may be transmitted on both the first radio resource type and the second radio resource type (e.g., licensed and unlicensed cells) and has(have) not achieved its PBR, apply and action 1-2 below for such logical channel(s) to the grouped grants. The MAC entity may update S1 or S2 as follows: S1=S1+total size of resources allocated to logical channels that may be transmitted on both the first radio resource type and the second radio resource type (e.g., licensed cells and LAA SCells), and S2=S2+total size of resources allocated to logical channels that may only be transmitted on the first radio resource type (e.g., licensed cells).

The MAC entity may apply action 3 below to logical channels. If data of a logical channel may be transmitted on both the first radio resource type and the second radio resource type (e.g., licensed cells and LAA SCells), S1>S2 and data in logical channels that may be transmitted only on the first radio resource type (e.g., licensed cells) is not exhausted, the MAC entity may skip the logical channel For action 1, the logical channels with Bj>0 may be allocated resources in a decreasing priority order. If the PBR of a logical channel is set to "infinity," the MAC entity may allocate resources for the data that is available for transmission on the logical channel before meeting the PBR of the lower priority logical channel(s). For action 2, the MAC entity may decrement Bj by the total size of MAC SDUs served to logical channel j above. The value of Bj may be negative. For action 3, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example scheduling mechanism, a UE may receive grants for transmission on one or more licensed cell(s) and one or more LAA SCell(s) in a TTI. In an example, eNB may signal the LBT priority class for the grant(s) on LAA SCells.

In an example, the MAC entity may group the grants on LAA SCells with the same signaled LBT priority class. The MAC entity may follow the procedures described in the previous examples and may first allocate the resources from the grants on LAA SCells and allocate resources of grants in licensed cells considering the amount of resources allocated in excess of the sum of PBRs of logical channels that may be transmitted on both licensed cells and LAA SCells. To allocate resources of an individual or grouped grant with an LBT priority class, the MAC entity may allocate resources of the individual or grouped grant to logical channel(s) that correspond to the LBT priority class of the individual or grouped grant. Once the data in logical channel(s) that correspond to the LBT priority class of the individual or grouped grant is exhausted, the MAC entity may allocate the resources to logical channel(s) that correspond to the higher order LBT priority class. In an example, the MAC entity may allocate resources of the individual or grouped grant to logical channel(s) that correspond to the LBT priority class of the individual or grouped grant or the logical channel channel(s) that correspond to the LBT priority classes higher than the LBT priority class of the individual or grouped grant (e.g., with stricter LBT requirements) of the individual or grouped grant.

In an example, a UE may be scheduled with a multi-subframe grant. The eNB may signal the LBT priority class and/or the UE may determine the LBT priority class based on the logical channels multiplexed in the burst after the logical channel prioritization procedure is completed and/or other criteria.

In an example embodiment, a UE may transmit logical channel(s) corresponding to a single LBT priority class (e.g., the LBT priority class signaled by eNB) in multiple sub-frames of a burst on a LAA SCell until the buffers of the logical channel(s) is(are) empty. UE may continue transmission of logical channel(s) corresponding to higher LBT priority class(es) (e.g., a single LBT priority class at a time until the buffer(s) of logical channel(s) corresponding to the LBT priority class is(are) empty). In an example, a UE may transmit logical channel(s) corresponding to the LBT priority class signaled by the eNB and the logical channel(s) corresponding to higher LBT priority classes (e.g., with stricter LBT requirements) in the subframes of a burst on a LAA SCell. until the buffers of the logical channel(s) is(are) empty.

In an example implementation, a UE may consider a subset of logical channels corresponding to the LBT priority class with positive Bj to construct the MAC PDUs. In an implementation, a UE may consider a logical channel corresponding to the LBT priority class even if the value of Bj is not positive.

In an example embodiment, if the sum of the capacity of grants on licensed cells is less than the sum of PBRs of logical channels with Bj>0 that may only be sent on licensed cells, a UE may be allowed to assign data from a logical channel that is configured to be only transmitted on the licensed cells to a MAC PDU on a LAA SCell.

In an example, if the sum of the capacity of grants on licensed cells is less than the sum of PBRs of logical channels with Bj>0 that may only be sent on licensed cells, a UE may be allowed to assign data from a logical channel that is configured to be only transmitted on the licensed cells to a MAC PDU on a LAA SCell if the sum of the capacity of grants on LAA SCells is larger than sum of PBRs of logical channels with Bj>0 that may be sent on both LAA SCells and licensed cells.

In an example embodiment, if the sum of the capacities of grants on licensed cells is less than sum of PBRs of logical channels with Bj>0 that may only be sent on licensed cells, a UE may be allowed to assign data from a logical channel that is configured to be only transmitted on the licensed cells to a MAC PDU on a LAA SCell if the logical channel(s) that may be transmitted on the LAA SCell (e.g., determined based on the LBT priority class and/or their value of Bj) are allocated at least as much as its(their) associated PBR.

In an example implementation, if the sum of the capacities of grants on the LAA SCell(s) is more than sum of buffered traffic in logical channels with Bj>0 that may be transmitted on both licensed cells and LAA SCells and/or if the difference is larger than a threshold, a may be allowed to assign data from a logical channel that is configured to be only transmitted on the licensed cells to a MAC PDU on a LAA SCell.

In an example, if the capacity of a grant on a LAA SCell is more than sum of buffered traffic in logical channels that may be transmitted on the LAA SCell (e.g., determined based on the LBT priority class and/or their value of Bj) and licensed cells and/or if the difference is larger than a threshold, a UE may be allowed to assign data from a logical channel that is configured to be only transmitted on the licensed cells to the MAC PDU on the LAA SCell.

In an example embodiment, if the value of Bj for logical channels that may be transmitted on both licensed and unlicensed cells is negative and/or if sum of the Bj values for logical channels that may be transmitted on both licensed and unlicensed cells is negative and/or if sum of the Bj values for logical channels that may be transmitted on both licensed and unlicensed cells is less than a configurable threshold, a UE may be allowed to assign data from a logical channel that is configured to be only transmitted on the licensed cells to a MAC PDU on a LAA SCell.

In an implementation, an eNB may indicate to a UE whether the UE is allowed to include data from logical channels configured for transmission on the licensed cells in the MAC PDU on a LAA SCell if certain conditions are met. The indication may be through RRC configuration and/or dynamic signaling.

In example embodiments, the UE may combine one or more data segments of the same logical channel (scheduled on the same group of cells) when the UE constructs MAC PDUs, and transmit the MAC PDU on a grant of a cell.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 20:
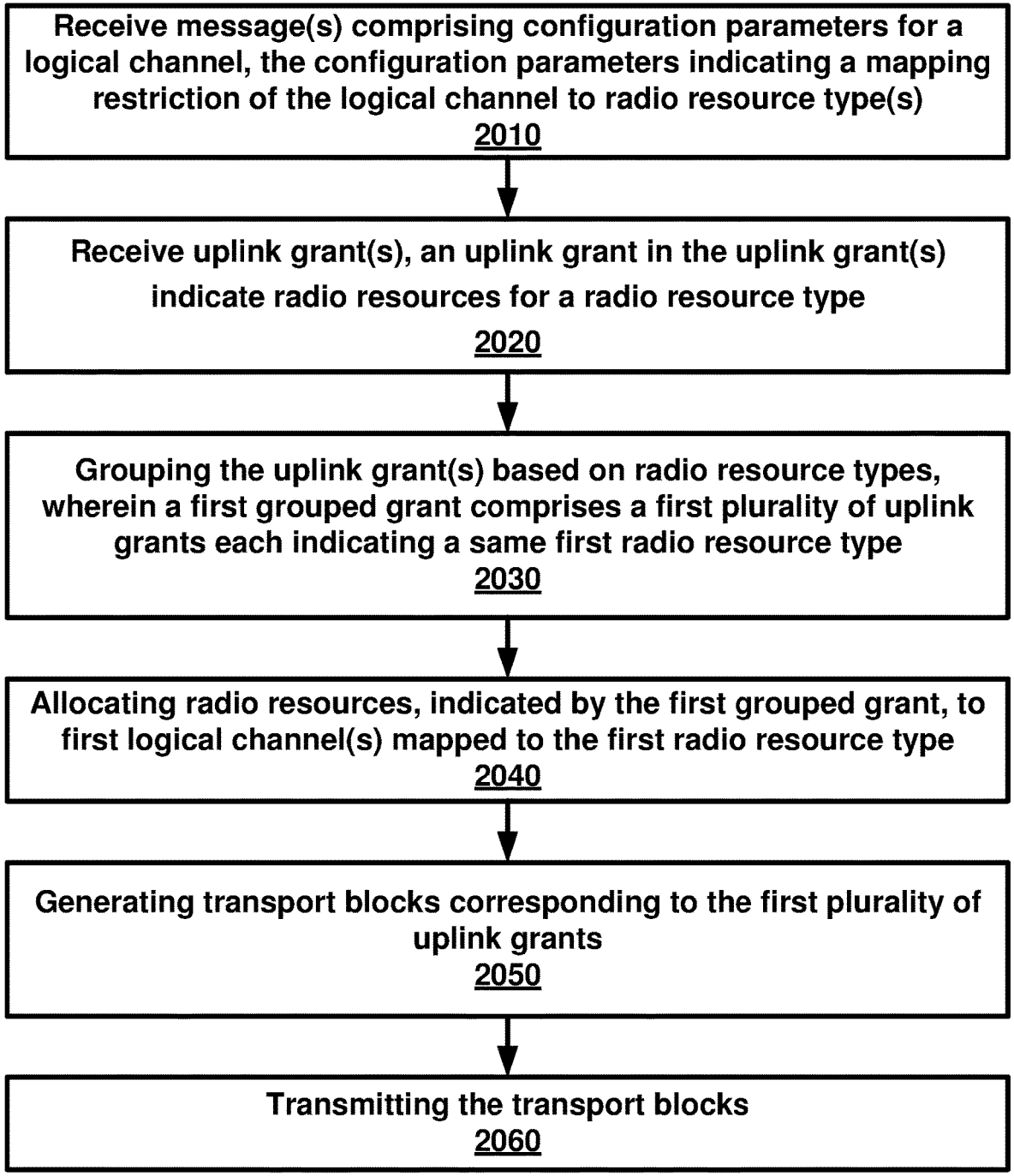
FIG. 20 is an example flow diagram as per an aspect of an embodiment of the present disclosure.

FIG. 20 is an example flow diagram as per an aspect of an embodiment of the present disclosure. A wireless device may receive one or more messages at 2010. The Message(s) may comprise configuration parameters for a logical channel in a plurality of logical channels. The configuration parameters may indicate a mapping restriction of the logical channel to one or more radio resource types in a plurality of radio resource types. According to an embodiment, the mapping restriction may be based, at least in part, on one or more quality of service (QoS) requirements of the logical channel. According to an embodiment, a QoS requirement may be based on a latency requirement of the logical channel.

At 2020, the wireless device may receive a plurality of uplink grants. An uplink grant in the plurality of uplink grants may indicate radio resources for a radio resource type in the plurality of radio resource types. According to an embodiment, the radio resource type may indicate a cell type. According to an embodiment, the cell type may comprise a licensed cell type. According to an embodiment, the cell type may comprise an unlicensed cell type.

At 2030, the plurality of uplink grants may be grouped into a plurality of grouped grants based on the plurality of radio resource types. A first grouped grant in the plurality of grouped grants may comprise a first plurality of uplink grants each indicating a same first radio resource type. According to an embodiment, a capacity of the first grouped grant may be equal to a sum of capacities of the first plurality of uplink grants.

At 2040, radio resources may be allocated, indicated by the first grouped grant, to one or more first logical channels mapped to the first radio resource type. According to an embodiment, the one or more first logical channels may comprise the logical channel According to an embodiment, the allocating radio resources may comprise employing a logical channel prioritization (LCP) procedure. According to an embodiment, the logical channel may be configured with a priority and a prioritized bit rate (PBR). According to an embodiment, the LCP procedure may employ the priority and the PBR of each of the one or more first logical channels.

At 2050, a plurality of transport blocks corresponding to the first plurality of uplink grants may be generated. At 2060, the wireless device may transmit the plurality of transport blocks.

Figure 21:
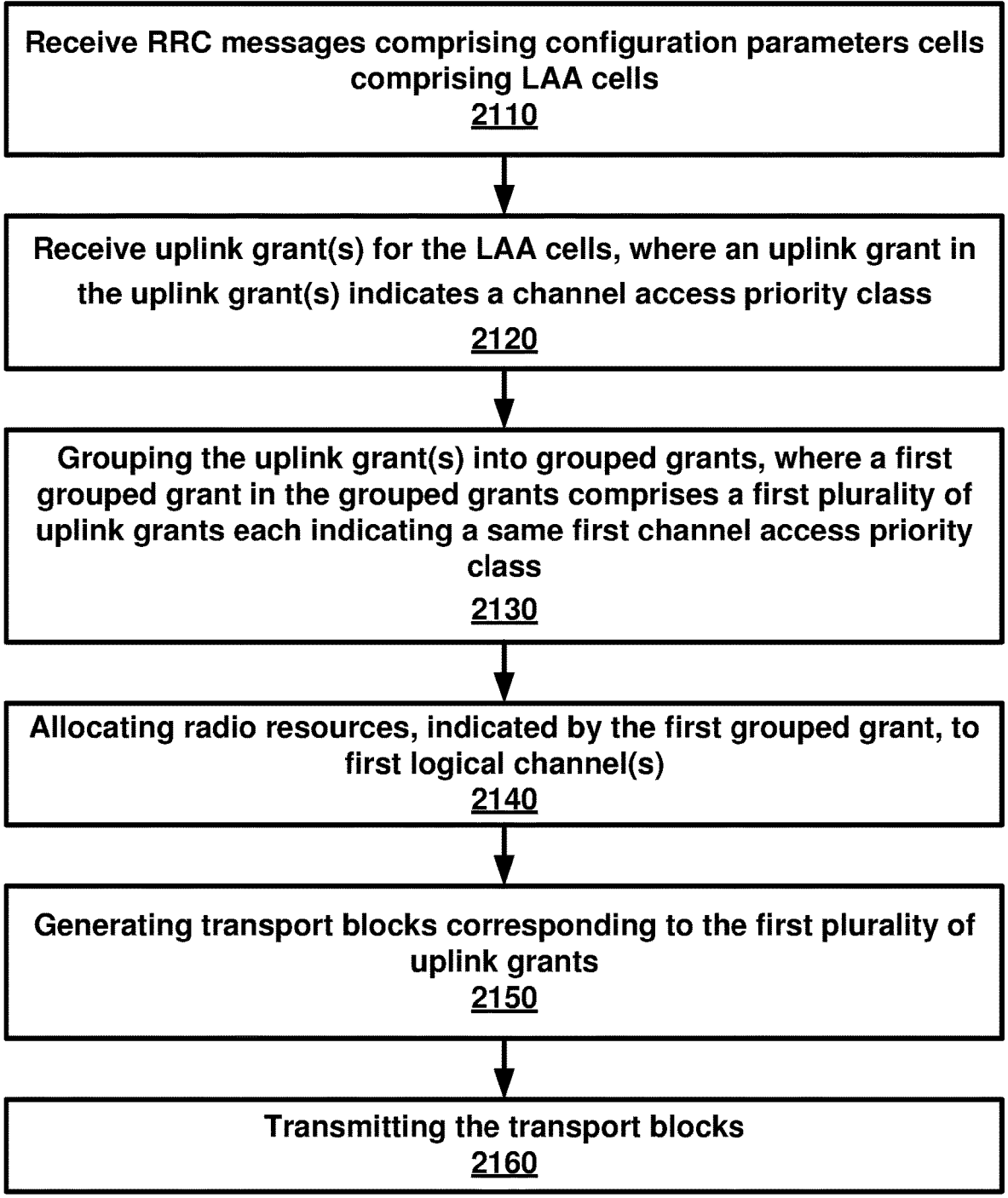
FIG. 21 is an example flow diagram as per an aspect of an embodiment of the present disclosure.

FIG. 21 is an example flow diagram as per an aspect of an embodiment of the present disclosure. At 2110, a wireless device may receive one or more radio resource control (RRC) messages. The RRC message(s) may comprise configuration parameters for a plurality of cells comprising a plurality of licensed assisted access (LAA) cells.

At 2120, the wireless device may receive a plurality of uplink grants for the plurality of LAA cells. An uplink grant in the plurality of uplink grants may indicate a channel access priority class. At 2130, a plurality of uplink grants may be grouped into a plurality of grouped grants. A first grouped grant in the plurality of grouped grants may comprise a first plurality of uplink grants each indicating a same first channel access priority class. According to an embodiment, a capacity of the first grouped grant may be equal to a sum of capacities of the first plurality of uplink grants. According to an embodiment, the plurality of uplink grants may comprise one or more single-subframe uplink grants and one or more multi-subframe uplink grants.

At 2140, radio resources may be allocated, indicated by the first grouped grant, to one or more first logical channels. According to an embodiment, the configuration parameters may indicate that data of the one or more first logical channels may be allowed to be transmitted via uplink of an LAA cell in the plurality of LAA cells. According to an embodiment, one or more quality of service (QoS) requirements of the one or more first logical channels may be satisfied if data of the one or more first logical channels is transmitted via uplink of an LAA cell in the plurality of LAA cells. According to an embodiment, the allocating radio resources may comprise employing a logical channel prioritization (LCP) procedure.

According to an embodiment, the one or more RRC messages may further comprise a logical channel priority. According to an embodiment, the one or more RRC messages may further comprise a logical channel prioritized bit rate (PBR). According to an embodiment, the one or more RRC messages may further comprise a logical channel bucket size duration (BSD). According to an embodiment, the LCP procedure may employ the logical channel priority. According to an embodiment, the LCP procedure may employ the logical channel PBR. According to an embodiment, the LCP procedure may employ the logical channel BSD of each of the one or more first logical channels.

At 2150, a plurality of transport blocks corresponding to the first plurality of grants may be generated. At 2160, the wireless device may transmit the plurality of transport blocks. According to an embodiment, a listen-before-talk (LBT) procedure may be performed before the transmitting the plurality of transport blocks. According to an embodiment, the LBT procedure may be based, at least in part, on the same first channel access priority class.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, uplink grants for licensed assisted access (LAA) cells, wherein an uplink grant in the uplink grants comprise a listen before talk class indicating a maximum channel occupancy time;
   grouping the uplink grants into grouped grants, wherein a first grouped grant of the grouped grants comprises a first plurality of uplink grants each indicating a listen before talk class of a same maximum channel occupancy time; and
   allocating radio resources, indicated by the first grouped grant, to one or more first logical channels;
   generating transport blocks corresponding to the first plurality of uplink grants; and
   transmitting, by the wireless device, the transport blocks.

2. The method of claim 1, further comprising receiving, by the wireless device, one or more radio resource control (RRC) messages comprising configuration parameters for cells comprising the LAA cells.

3. The method of claim 2, further comprising performing a first plurality of listen-before-talk procedures, based on the listen before talk class of the same maximum channel occupancy time, for the first plurality of uplink grants of the first grouped grant.

4. The method of claim 3, wherein the transmitting the transport blocks is in response to the first plurality of listen-before-talk procedures being successful.

5. The method of claim 4, wherein the configuration parameters indicate that data of the one or more first logical channels is allowed to be transmitted via uplink of an LAA cell in the LAA cells.

6. The method of claim 5, wherein the allocating radio resources is based on a logical channel prioritization (LCP) procedure.

7. The method of claim 6, wherein the one or more RRC messages further comprise at least one of: a logical channel priority, a logical channel prioritized bit rate (PBR), and a logical channel bucket size duration (BSD).

8. The method of claim 7, wherein the LCP procedure is based on at least one of the logical channel priority, the logical channel PBR and the logical channel BSD of each of the one or more first logical channels.

9. The method of claim 8, wherein the first plurality of listen-before-talk procedures comprise at least one clear channel assessment.

10. The method of claim 9, wherein the at least one clear channel assessment comprises at least one energy detection.

11. The method of claim 10, wherein the uplink grants comprise one or more single-subframe uplink grants and one or more multi-subframe uplink grants.

12. The method of claim 11, wherein one or more quality of service (QoS) requirements of the one or more first logical channels are satisfied based on data of the one or more first logical channels being transmitted via uplink of an LAA cell in the LAA cells.

13. The method of claim 12, wherein a capacity of the first grouped grant is equal to a sum of capacities of the first plurality of uplink grants.

14. The method of claim 2, wherein the one or more RRC messages further comprise at least one of: a logical channel priority, a logical channel prioritized bit rate (PBR), and a logical channel bucket size duration (BSD).

15. The method of claim 1, further comprising performing a first plurality of listen-before-talk procedures, based on the listen before talk class of the same maximum channel occupancy time, for the first plurality of uplink grants of the first grouped grant.

16. The method of claim 15, wherein the transmitting the transport blocks is in response to the first plurality of listen-before-talk procedures being successful.

17. The method of claim 16, wherein a capacity of the first grouped grant is equal to a sum of capacities of the first plurality of uplink grants, wherein the one or more first logical channels are served based on the capacity.

18. The method of claim 1, wherein a capacity of the first grouped grant is equal to a sum of capacities of the first plurality of uplink grants, wherein the one or more first logical channels are served based on the capacity.

19. The method of claim 18, further comprising performing a first plurality of listen-before-talk procedures, based on the listen before talk class of the same maximum channel occupancy time, for the first plurality of uplink grants of the first grouped grant.

20. The method of claim 19, wherein the transmitting the transport blocks is in response to the first plurality of listen-before-talk procedures being successful.

* * * * *